US012795431B2

(12) United States Patent
Liu et al.

(10) Patent No.: US 12,795,431 B2
(45) Date of Patent: Nov. 10, 2026

(54) USER EQUIPMENT PROCESSING CAPABILITY FOR MULTICAST AND UNICAST

(71) Applicant: QUALCOMM Incorporated, San Diego, CA (US)

(72) Inventors: Le Liu, San Jose, CA (US); Alberto Rico Alvarino, San Diego, CA (US); Peter Gaal, San Diego, CA (US); Jae Ho Ryu, San Diego, CA (US); Hari Sankar, San Diego, CA (US); Rebecca Wen-Ling Yuan, San Diego, CA (US); Hobin Kim, San Diego, CA (US); Sanghoon Kim, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 542 days.

(21) Appl. No.: 18/169,513

(22) Filed: Feb. 15, 2023

(65) Prior Publication Data

US 2023/0269619 A1 Aug. 24, 2023

Related U.S. Application Data

(60) Provisional application No. 63/268,274, filed on Feb. 20, 2022.

(51) Int. Cl.
*H04W 28/02* (2009.01)
*H04W 72/0446* (2023.01)
*H04W 72/23* (2023.01)

(52) U.S. Cl.
CPC ... *H04W 28/0215* (2013.01); *H04W 72/0446* (2013.01); *H04W 72/23* (2023.01)

(58) Field of Classification Search
CPC ............. H04W 28/0215; H04W 72/23; H04W 72/0446
USPC ............................................... 370/329
See application file for complete search history.

(56) References Cited

U.S. PATENT DOCUMENTS

2017/0222763 A1* 8/2017 Lee ....................... H04W 16/14
2017/0303136 A1* 10/2017 Park .................. H04W 74/0808
2020/0106566 A1* 4/2020 Yeo ....................... H04L 1/1854

* cited by examiner

*Primary Examiner* — Asad M Nawaz
(74) *Attorney, Agent, or Firm* — Harrity & Harrity, LLP

(57) ABSTRACT

Various aspects of the present disclosure generally relate to wireless communication. In some aspects, a user equipment (UE) may transmit, to a network entity, capability information relating to a capability of the UE for processing unicast and multicast physical downlink shared channel (PDSCH) transmissions. The UE may receive configuration information that indicates unicast parameters for unicast PDSCH transmissions and multicast parameters for multicast PDSCH transmissions. The UE may receive at least one of one or more unicast PDSCH transmissions or one or more multicast PDSCH transmissions in a slot in a serving cell in accordance with a maximum soft buffer size associated with the UE and a maximum data rate associated with the UE, wherein the maximum soft buffer size and the maximum data rate are based at least in part on at least one of the unicast parameters or the multicast parameters. Numerous other aspects are described.

30 Claims, 9 Drawing Sheets

USER EQUIPMENT PROCESSING CAPABILITY FOR MULTICAST AND UNICAST

CROSS-REFERENCE TO RELATED APPLICATION

This Patent Application claims priority to U.S. Provisional Patent Application No. 63/268,274, filed on Feb. 20, 2022, entitled "USER EQUIPMENT PROCESSING CAPABILITY FOR MULTICAST AND UNICAST" and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for a user equipment (UE) processing capability for multicast and unicast transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for wireless communication devices, such as a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to transmit, to a network entity, capability information relating to a capability of the UE for processing unicast and multicast physical downlink shared channel (PDSCH) transmissions. The one or more processors may be configured to receive, from the network entity, configuration information that indicates unicast parameters for unicast PDSCH transmissions and multicast parameters for multicast PDSCH transmissions. The one or more processors may be configured to receive at least one of one or more unicast PDSCH transmissions or one or more multicast PDSCH transmissions in a slot in a serving cell in accordance with a maximum soft buffer size associated with the UE and a maximum data rate associated with the UE, wherein the maximum soft buffer size and the maximum data rate are based at least in part on at least one of the unicast parameters or the multicast parameters, and wherein the maximum soft buffer size is an upper bound of transport block (TB) size with limited buffer rate matching (LBRM) for allocated TBs in a time duration within an active bandwidth part (BWP) on the serving cell.

Some aspects described herein relate to a network entity for wireless communication. The network entity may include a memory and one or more processors coupled to the memory. The one or more processors may be configured to receive capability information relating to a capability of a UE for processing unicast and multicast PDSCH transmissions. The one or more processors may be configured to transmit configuration information that indicates unicast parameters for unicast PDSCH transmissions and multicast parameters for multicast PDSCH transmissions. The one or more processors may be configured to transmit at least one of one or more unicast PDSCH transmissions or one or more multicast PDSCH transmissions in a slot in a serving cell in accordance with a maximum soft buffer size associated with the UE and a maximum data rate associated with the UE, wherein the maximum soft buffer size and the maximum data rate are based at least in part on at least one of the unicast parameters or the multicast parameters, and wherein the maximum soft buffer size is an upper bound of TB size with LBRM for allocated TBs in a time duration within an active BWP on the serving cell.

Some aspects described herein relate to a method of wireless communication performed by a UE. The method may include transmitting, to a network entity, capability information relating to a capability of the UE for processing unicast and multicast PDSCH transmissions. The method may include receiving, from the network entity, configuration information that indicates unicast parameters for unicast PDSCH transmissions and multicast parameters for multicast PDSCH transmissions. The method may include receiving at least one of one or more unicast PDSCH transmissions or one or more multicast PDSCH transmissions in a slot in a serving cell in accordance with a maximum soft buffer size associated with the UE and a maximum data rate associated with the UE, wherein the maximum soft buffer size and the maximum data rate are based at least in part on at least one of the unicast parameters or the multicast parameters, and wherein the maximum soft buffer size is an upper bound of TB size with LBRM for allocated TBs in a time duration within an active BWP on the serving cell.

Some aspects described herein relate to a method of wireless communication performed by a network entity. The method may include receiving capability information relating to a capability of a UE for processing unicast and multicast PDSCH transmissions. The method may include transmitting configuration information that indicates unicast parameters for unicast PDSCH transmissions and multicast parameters for multicast PDSCH transmissions. The method may include transmitting at least one of one or more unicast PDSCH transmissions or one or more multicast PDSCH transmissions in a slot in a serving cell in accordance with a maximum soft buffer size associated with the UE and a maximum data rate associated with the UE, wherein the maximum soft buffer size and the maximum data rate are based at least in part on at least one of the unicast parameters or the multicast parameters, and wherein the maximum soft buffer size is an upper bound of TB size with LBRM for allocated TBs in a time duration within an active BWP on the serving cell.

Some aspects described herein relate to a non-transitory computer-readable medium that stores a set of instructions for wireless communication by a UE. The set of instructions, when executed by one or more processors of the UE, may cause the UE to transmit, to a network entity, capability information relating to a capability of the UE for processing unicast and multicast PDSCH transmissions. The set of instructions, when executed by one or more processors of the UE, may cause the UE to receive, from the network entity, configuration information that indicates unicast parameters for unicast PDSCH transmissions and multicast parameters for multicast PDSCH transmissions. The set of instructions, when executed by one or more processors of the UE, may cause the UE to receive at least one of one or more unicast PDSCH transmissions or one or more multicast PDSCH transmissions in a slot in a serving cell in accordance with a maximum soft buffer size associated with the UE and a maximum data rate associated with the UE, wherein the maximum soft buffer size and the maximum data rate are based at least in part on at least one of the unicast parameters or the multicast parameters, and wherein the maximum soft buffer size is an upper bound of TB size with LBRM for allocated TBs in a time duration within an active BWP on the serving cell.

Some aspects described herein relate to a non-transitory computer-readable medium that stores a set of instructions for wireless communication by a network entity. The set of instructions, when executed by one or more processors of the network entity, may cause the network entity to receive capability information relating to a capability of a UE for processing unicast and multicast PDSCH transmissions. The set of instructions, when executed by one or more processors of the network entity, may cause the network entity to transmit configuration information that indicates unicast parameters for unicast PDSCH transmissions and multicast parameters for multicast PDSCH transmissions. The set of instructions, when executed by one or more processors of the network entity, may cause the network entity to transmit at least one of one or more unicast PDSCH transmissions or one or more multicast PDSCH transmissions in a slot in a serving cell in accordance with a maximum soft buffer size associated with the UE and a maximum data rate associated with the UE, wherein the maximum soft buffer size and the maximum data rate are based at least in part on at least one of the unicast parameters or the multicast parameters, and wherein the maximum soft buffer size is an upper bound of TB size with LBRM for allocated TBs in a time duration within an active BWP on the serving cell.

Some aspects described herein relate to an apparatus for wireless communication. The apparatus may include means for transmitting, to a network entity, capability information relating to a capability of for processing unicast and multicast PDSCH transmissions. The apparatus may include means for receiving, from the network entity, configuration information that indicates unicast parameters for unicast PDSCH transmissions and multicast parameters for multicast PDSCH transmissions. The apparatus may include means for receiving at least one of one or more unicast PDSCH transmissions or one or more multicast PDSCH transmissions in a slot in a serving cell in accordance with a maximum soft buffer size and a maximum data rate, wherein the maximum soft buffer size and the maximum data rate are based at least in part on at least one of the unicast parameters or the multicast parameters, and wherein the maximum soft buffer size is an upper bound of TB size with LBRM for allocated TBs in a time duration within an active BWP on the serving cell.

Some aspects described herein relate to an apparatus for wireless communication. The apparatus may include means for receiving capability information relating to a capability of a UE for processing unicast and multicast PDSCH transmissions. The apparatus may include means for transmitting configuration information that indicates unicast parameters for unicast PDSCH transmissions and multicast parameters for multicast PDSCH transmissions. The apparatus may include means for transmitting at least one of one or more unicast PDSCH transmissions or one or more multicast PDSCH transmissions in a slot in a serving cell in accordance with a maximum soft buffer size associated with the UE and a maximum data rate associated with the UE, wherein the maximum soft buffer size and the maximum data rate are based at least in part on at least one of the unicast parameters or the multicast parameters, and wherein the maximum soft buffer size is an upper bound of TB size with LBRM for allocated TBs in a time duration within an active BWP on the serving cell.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
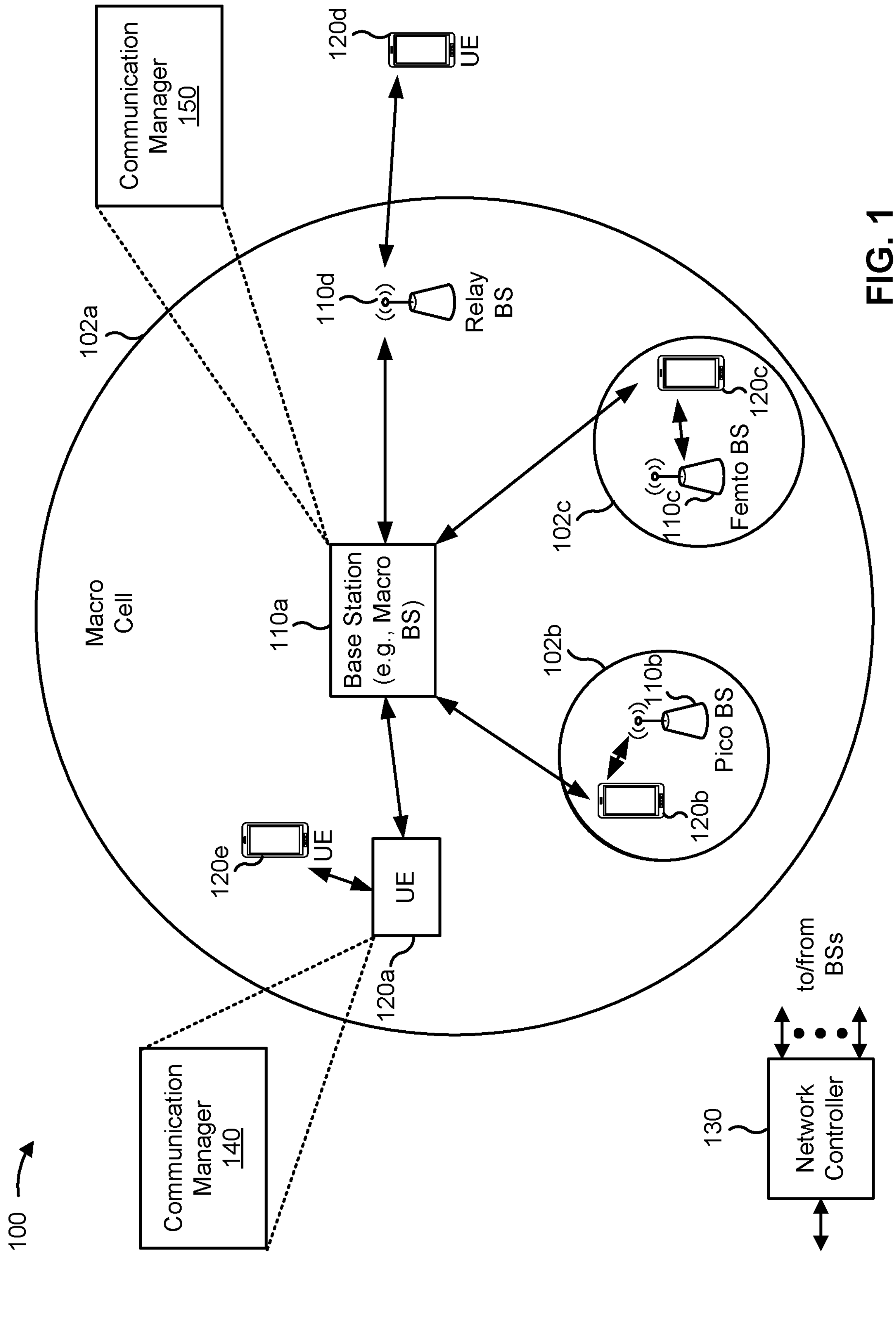
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells. In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a central unit (CU), a distributed unit (DU), a radio unit (RU), a Near-Real Time (Near-RT) RAN Intelligent Controller (MC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a base station 110 or a UE 120) and send a transmission of the data to a downstream node (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay network node, a relay node, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link or a midhaul communication link. The base stations 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peerto-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to a network entity, capability information relating to a capability of the UE for processing unicast and multicast physical downlink shared channel (PDSCH) transmissions; receive, from the network entity, configuration information that indicates unicast parameters for unicast PDSCH transmissions and multicast parameters for multicast PDSCH transmissions; and receive at least one of one or more unicast PDSCH transmissions or one or more multicast PDSCH transmissions in a slot in a serving cell in accordance with a maximum soft buffer size associated with the UE and a maximum data rate associated with the UE, wherein the maximum soft buffer size and the maximum data rate are based at least in part on at least one of the unicast parameters or the multicast parameters, and wherein the maximum soft buffer size is an upper bound of transport block (TB) size with limited buffer rate matching (LBRM) for allocated TBs in a time duration within an active bandwidth part (BWP) on the serving cell. Additionally, or alternatively, the communication manager 140 may perform one or more other operations described herein.

In some aspects, a network entity (e.g., a base station 110 or one or more components described in connection with FIG. 3) may include a communication manager 150. As described in more detail elsewhere herein, the communication manager 150 may receive capability information relating to a capability of a UE for processing unicast and multicast PDSCH transmissions; transmit configuration information that indicates unicast parameters for unicast PDSCH transmissions and multicast parameters for multicast PDSCH transmissions; and transmit at least one of one or more unicast PDSCH transmissions or one or more multicast PDSCH transmissions in a slot in a serving cell in accordance with a maximum soft buffer size associated with the UE and a maximum data rate associated with the UE, wherein the maximum soft buffer size and the maximum data rate are based at least in part on at least one of the unicast parameters or the multicast parameters, and wherein the maximum soft buffer size is an upper bound of TB size with LBRM for allocated TBs in a time duration within an active BWP on the serving cell. Additionally, or alternatively, the communication manager 150 may perform one or more other operations described herein.

As indicated above, FIG. 1 is provided as an example. Other examples may differ from what is described with regard to FIG. 1.

Figure 2:
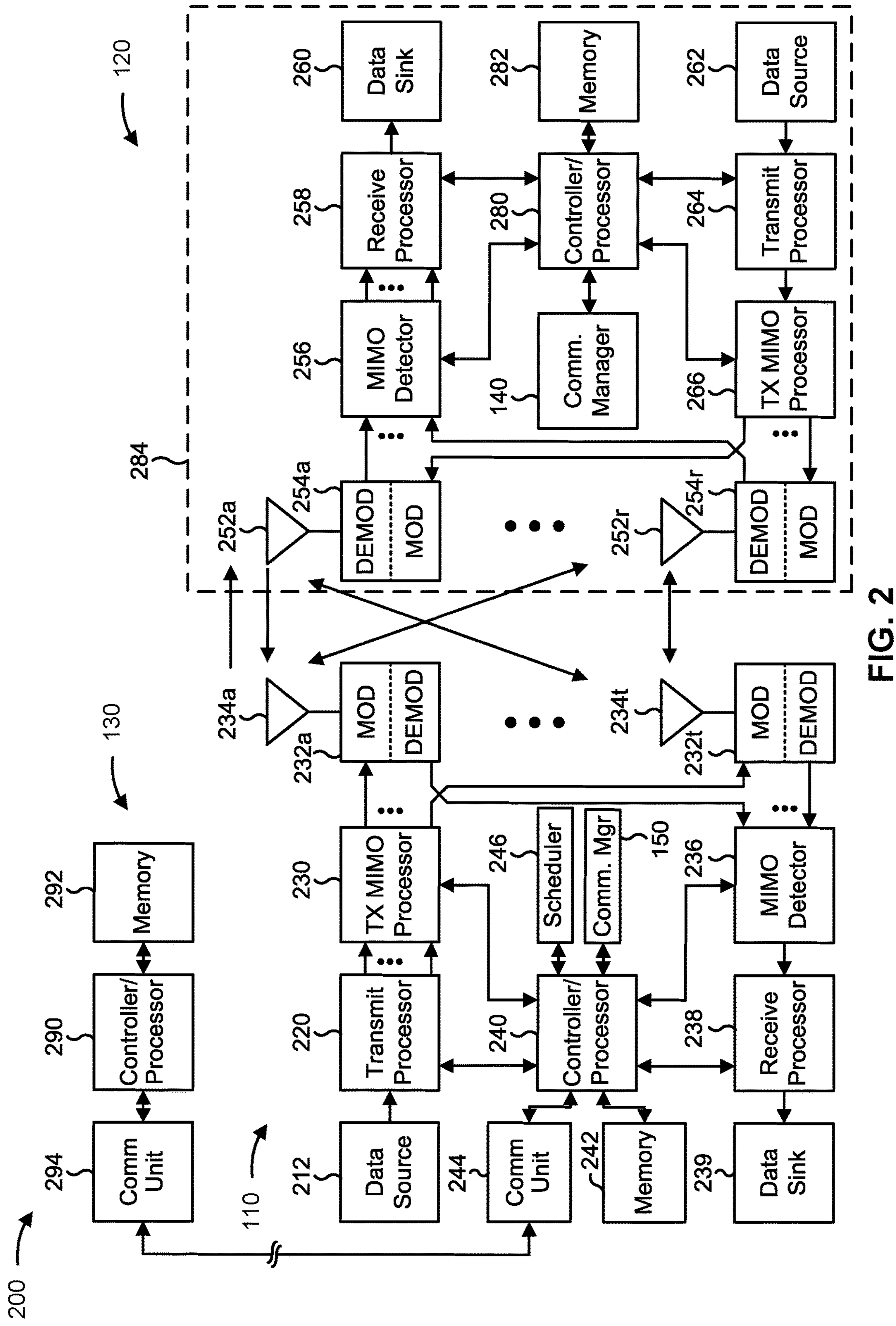
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with a UE processing capability for multicast and unicast transmissions, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples. In some aspects, a network entity described herein is the base station 110, is included in the base station 110, or includes one or more components of the base station 110 shown in FIG. 2.

In some aspects, a UE (e.g., the UE 120) includes means for transmitting, to a network entity, capability information relating to a capability of the UE for processing unicast and multicast PDSCH transmissions; means for receiving, from the network entity, configuration information that indicates unicast parameters for unicast PDSCH transmissions and multicast parameters for multicast PDSCH transmissions; and/or means for receiving at least one of one or more unicast PDSCH transmissions or one or more multicast PDSCH transmissions in a slot in a serving cell in accordance with a maximum soft buffer size associated with the UE and a maximum data rate associated with the UE, wherein the maximum soft buffer size and the maximum data rate are based at least in part on at least one of the unicast parameters or the multicast parameters, and wherein the maximum soft buffer size is an upper bound of TB size with LBRM for allocated TBs in a time duration within an active BWP on the serving cell. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity includes means for receiving capability information relating to a capability of a UE for processing unicast and multicast PDSCH transmissions; means for transmitting configuration information that indicates unicast parameters for unicast PDSCH transmissions and multicast parameters for multicast PDSCH transmissions; and/or means for transmitting at least one of one or more unicast PDSCH transmissions or one or more multicast PDSCH transmissions in a slot in a serving cell in accordance with a maximum soft buffer size associated with the UE and a maximum data rate associated with the UE, wherein the maximum soft buffer size and the maximum data rate are based at least in part on at least one of the unicast parameters or the multicast parameters, and wherein the maximum soft buffer size is an upper bound of TB size with LBRM for allocated TBs in a time duration within an active BWP on the serving cell. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. “Network entity” or “network node” may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
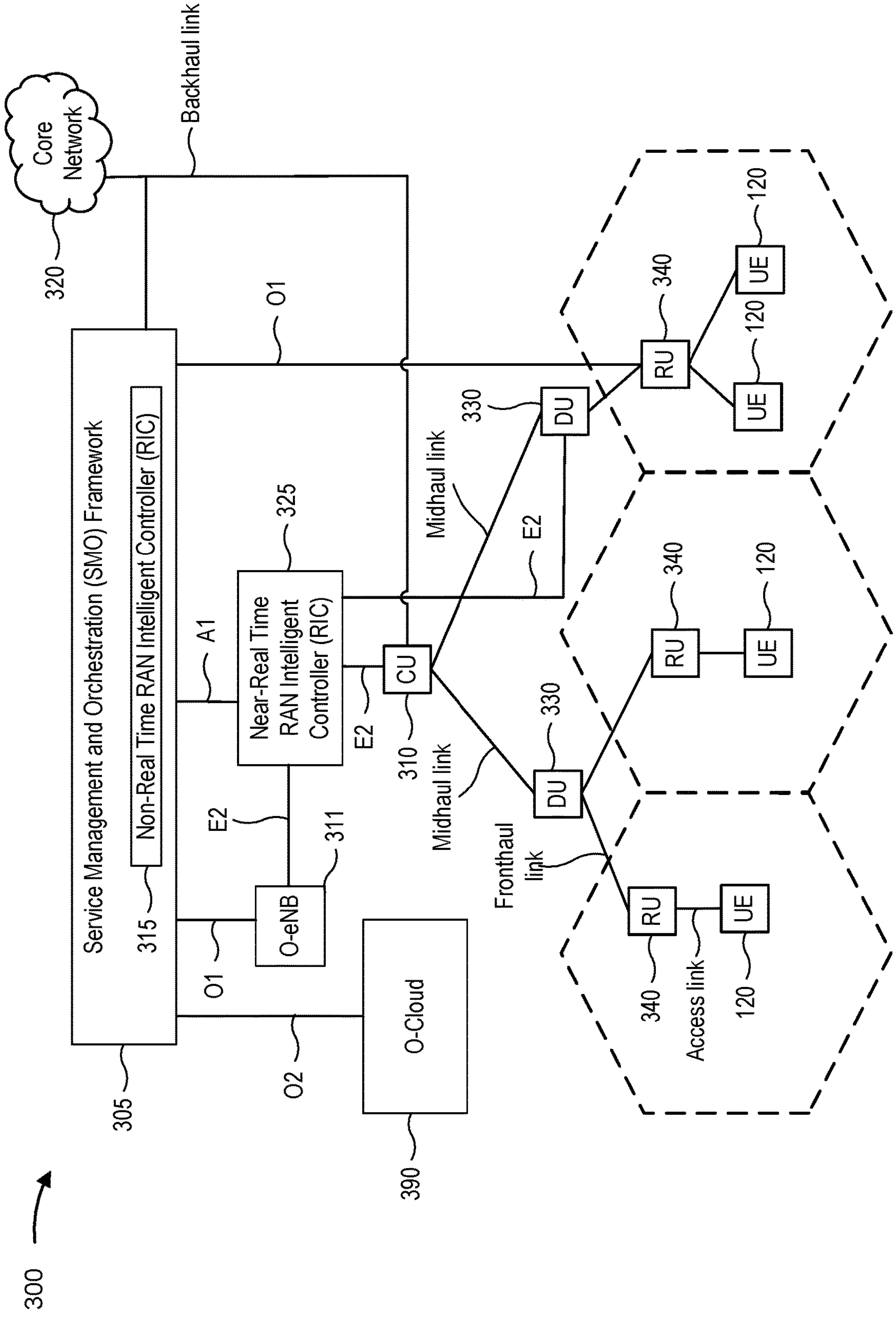
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT MC 325.

In some implementations, to generate AI/ML models to be deployed in the Near-RT MC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
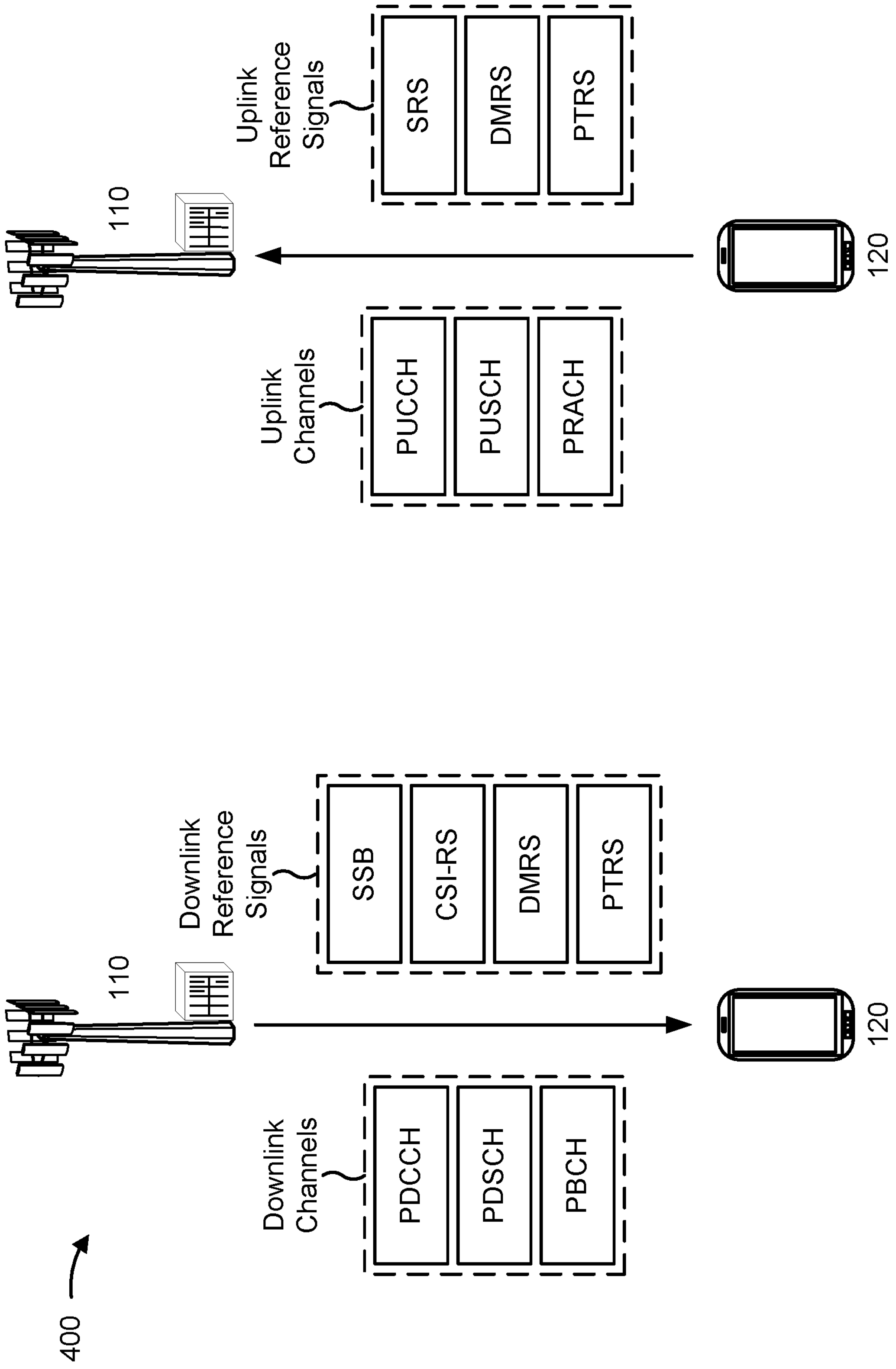
FIG. 4 is a diagram illustrating an example of physical channels and reference signals in a wireless network, in accordance with the present disclosure.

FIG. 4 is a diagram illustrating an example 400 of physical channels and reference signals in a wireless network, in accordance with the present disclosure. As shown in FIG. 4, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a PDSCH that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or PRACH used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 4 is provided as an example. Other examples may differ from what is described with regard to FIG. 4.

In some examples, a base station may limit the PDSCH transmission in a time period (e.g., a slot) in a serving cell in accordance with a maximum soft buffer size for a UE and a maximum data rate for the UE. "Maximum soft buffer size" refers to a maximum soft buffer size for log-likelihood ratio (LLR) loading for the UE. In some examples, the base station may not transmit, to the UE in a serving cell, PDSCH TBs that exceed the maximum soft buffer size for the UE in a certain time period. For example, the UE 120 may not be expected to handle any TBs in a 14 consecutive-symbol duration for a normal cyclic prefix (CP) (or a 12 consecutive-symbol duration for an extended CP) ending at the last symbol of the latest PDSCH transmission within an active BWP on a serving cell whenever:

$$2^{max(0,\mu-\mu')} \cdot \sum_{i\in S} \left\lceil \frac{C_i'}{L_i} \right\rceil x_i \cdot F_i > \left\lceil \frac{X}{4} \right\rceil \cdot \frac{1}{R_{LBRM}} \cdot TBS_{LBRM}$$

where, for the serving cell, X is a maximum number of MIMO layers (e.g., maxMIMO-Layers) configured (e.g., via an RRC configuration) for PDSCH transmissions, $R_{LBRM}$ is a coding rate for LBRM that has a fixed value (e.g., $R_{LBRM}$ 4=⅔) that may be defined in a wireless communication standard, and $TBS_{LBRM}$ is a maximum TB size for LBRM determined based on configured PDSCH parameters, such as X, a maximum modulation order ($Q_m$), a maximum number of physical resource blocks (PRBs) of configured downlink BWPs ($n_{PRB,LBRM}$), and a configured overhead parameter (xOverhead). Accordingly, the maximum soft buffer $$\left(\left\lceil \frac{X}{4} \right\rceil \cdot \frac{1}{R_{LBRM}} \cdot TBS_{LBRM}\right)$$

is an upper bound of TB size with LBRM (e.g., an upper bound of $TBS_{LBRM}$) for allocated TBs in a 14 consecutive-symbol duration for a normal cyclic prefix (CP) (or a 12 consecutive-symbol duration for an extended CP) ending at the last symbol of the latest PDSCH transmission within an active BWP on a serving cell. S is the set of TBs belonging to PDSCH(s) that are partially or fully contained in the consecutive symbol duration. For the i-th TB, $$C_i'$$

is a number of scheduled code blocks, $L_i$ is a number of OFDM symbols assigned to the PDSCH, $x_i$ is a number of OFDM symbols of the PDSCH contained in the consecutive-symbol duration, and $$F_i = \max_{j=0,\ldots,J-1}\left(\min\left(k_{0,i}^j + E_i^j,\ N_{cb,i}\right)\right),$$

where $$k_{0,i}^j$$

is a starting location of a redundancy version (RV) for the j-th transmission, $$F_i = \max_{j=0,\ldots,J-1}\left(\min\left(k_{0,i}^j + E_i^j,\ N_{cb,i}\right)\right),$$

(e.g., the rate matching output sequency length) of the scheduled code blocks for the j-th transmission, $N_{cb,i}$ is a circular buffer length, and J−1 is the current transmission or retransmission for the i-th TB. μ corresponds to the subcarrier spacing (SCS) of the active BWP, and μ' corresponds to the SCS of a BWP (across all configured BWPs of a carrier) that has the largest configured number of PRBs. In case there is more than one BWP corresponding to the largest configured number of PRBs, μ' follows the BWP with the largest SCS.

The maximum data rate for the UE may be based at least in part on configured PDSCH parameters and UE capability information. In some examples, the base station may not transmit, to the UE in a slot in a serving cell, PDSCH transmissions that exceed the maximum data rate for the UE. For example, within a cell group, the UE may not be required to handle any PDSCH transmissions in slot $s_j$ in serving cell j, and for j=0, 1, 2, . . . J−1, slot $s_j$ overlapping with any given point in time, if the following condition is not satisfied at that point in time:

$$\sum_{j=0}^{J-1} \frac{\sum_{m=0}^{M-1} V_{j,m}}{T_{slot}^{\mu(j)}} \leq \text{DataRate}$$

where DataRate is the maximum data rate (in Mbps) for the UE. DataRate may be computed as the maximum data rate summed over all of the carriers in the frequency range for any signalled band combination as follows:

$$\text{DataRate} = 10^{-6}\sum_{j=1}^{J}\left(v_{Layers}^{(j)} \cdot Q_m^{(j)} \cdot f^{(j)} \cdot R_{max} \cdot \frac{N_{PRB}^{BW(j),\mu} \cdot 12}{T_{slot}^{\mu(j)}} \cdot \left(1 - \text{OH}^{(j)}\right)\right)$$

where J is the number of configured serving cells belonging to a frequency range and $R_{max}$ is a fixed maximum coding rate (e.g., $R_{max}$=948/1024). For the j-th serving cell (e.g., the j-th component carrier (CC)), $$v_{Layers}^{(j)}$$

is the maximum number of layers, $$Q_m^{(j)}$$

is the maximum modulation order, $f^{(j)}$ is a scaling factor that is signalled by the UE per band or per band combination, μ(j) is the numerology (e.g., SCS) in slot $s_j$ of the j-th serving cell, $$T_{slot}^{\mu(j)}$$

is the average OFDM symbol duration in a subframe for numerology $$\mu(j)\left(\text{e.g., } T_{slot}^{\mu(j)} = 10^{-3}/2^{\mu(j)}\right),\ N_{PRB}^{BW(j),\mu}$$

is a maximum number of PRBs in a UE supported maximum bandwidth (BW(j)) with numerology μ(j), and $OH^{(j)}$ is an overhead parameter. M is the number of TB(s) transmitted in slot $s_j$ of the j-th serving cell. If there are two PDSCH transmission occasions of the same TB (in the time domain or in the frequency domain) in the slot $s_j$, each transmission occasion is counted separately. For the m-th TB in the slot $s_j$ of the j-th serving cell, $$V_{j,m} = C' \cdot \left\lfloor \frac{A}{C} \right\rfloor,$$

where A is the number of bits in the TB, C is the total number of code blocks for the TB, and C' is the number of scheduled code blocks for the TB.

In some examples, for RRC connected UEs, support for simultaneous reception of unicast PDSCH transmissions and multicast PDSCH transmissions may be subject to UE capability. A unicast PDSCH transmission is a PDSCH transmission from a base station to a particular UE. A multicast PDSCH transmission is a PDSCH transmission from a base station to a group of UEs. Multicast PDSCH transmissions may also be referred to as group common PDSCH (GC-PDSCH) transmissions. Multicast PDSCH transmissions may be scheduled by DCI format 4_1, or DCI format 4_2 associated with a group radio network temporary identifier (RNTI) (G-RNTI) for dynamic grant multicast transmission or a group configured scheduling RNTI (G-CS-RNTI) for a semi-persistent scheduling (SPS) multicast transmission. In a case in which a UE supports receiving unicast and multicast PDSCH transmissions in the same slot, one or more unicast PDSCH transmissions (to the UE) and one or more multicast PDSCH transmissions (to a group of UEs including the UE) may be multiplexed in the same slot using frequency division multiplexing (FDM) or time division multiplexing (TDM). For RRC connected UEs, support for simultaneous reception of unicast PDSCH transmissions and broadcast PDSCH transmissions may be also subject to UE capability. Broadcast PDSCH transmissions may also be also referred to as GC-PDSCH transmissions. Broadcast PDSCH transmissions may be scheduled by DCI format 4_0 associated with a multicast and broadcast services (MBS) control channel (MCCH) RNTI (MCCH-RNTI) for an MCCH transmission or a G-RNTI for an MBS traffic channel (MTCH) transmission. In a case in which a UE supports receiving unicast, broadcast and/or multicast PDSCH transmissions in the same slot, one or more unicast PDSCH transmissions (to the UE) and one or more multicast/broadcast PDSCH transmissions (to a group of UEs including the UE) may be multiplexed in the same slot using FDM or TDM. The following description is focusing on the case of unicast and multicast PDSCH transmissions in a slot. It may be extended to the case of unicast broadcast and/or multicast PDSCH transmissions in a slot.

In some examples, in a case in which a UE is configured with frequency division multiplexed or time division multiplexed unicast and multicast PDSCH transmissions in a slot on a serving cell, the UE may be configured with separate parameters for the unicast and multicast PDSCH transmissions. For example, the UE may be configured parameters for the maximum number of layers, maximum modulation order, overhead parameter, and/or maximum number of PRBs for unicast and multicast PDSCH transmissions, respectively. Accordingly, different values for $TBS_{LBRM}$, the maximum soft buffer size $$\left(\left\lceil \frac{X}{4} \right\rceil \cdot \frac{1}{R_{LBRM}} \cdot TBS_{LBRM}\right),$$

and the maximum data rate (DataRate) may be determined depending on whether the unicast parameters or the multicast parameters are used. Without a rule to determine which of the unicast or the multicast parameters to use to calculate the maximum soft buffer size and the maximum data rate for unicast and multicast PDSCH transmissions, there may be confusion between the base station and the UE as to maximum soft buffer size and the maximum data rate for the UE, particularly in cases in which multiplexed unicast PDSCH transmissions and multicast PDSCH transmissions are transmitted to the UE in the same slot in a serving cell. This may decrease reliability of PDSCH communications from the base station to the UE.

Some techniques and apparatuses described herein enable a UE to transmit, to a network entity, capability information relating to a capability of the UE for processing unicast and multicast PDSCH transmissions. The network entity may transmit, and the UE may receive, configuration information that indicates unicast parameters for unicast PDSCH transmissions and multicast parameters for multicast PDSCH transmissions. The network entity may transmit, and the UE may receive, at least one of one or more unicast PDSCH transmissions or one or more multicast PDSCH transmissions in accordance with a maximum soft buffer size associated with the UE and a maximum data rate associated with the UE. The maximum soft buffer size and the maximum data rate may be based at least in part on at least one of the unicast parameters or the multicast parameters. As a result, confusion between the network entity and the UE as to which of the unicast or multicast parameters are to be used to determine the maximum soft buffer size and the maximum data rate for the UE may be reduced, which increases reliability of unicast and multicast PDSCH transmissions from the network entity to the UE.

Figure 5:
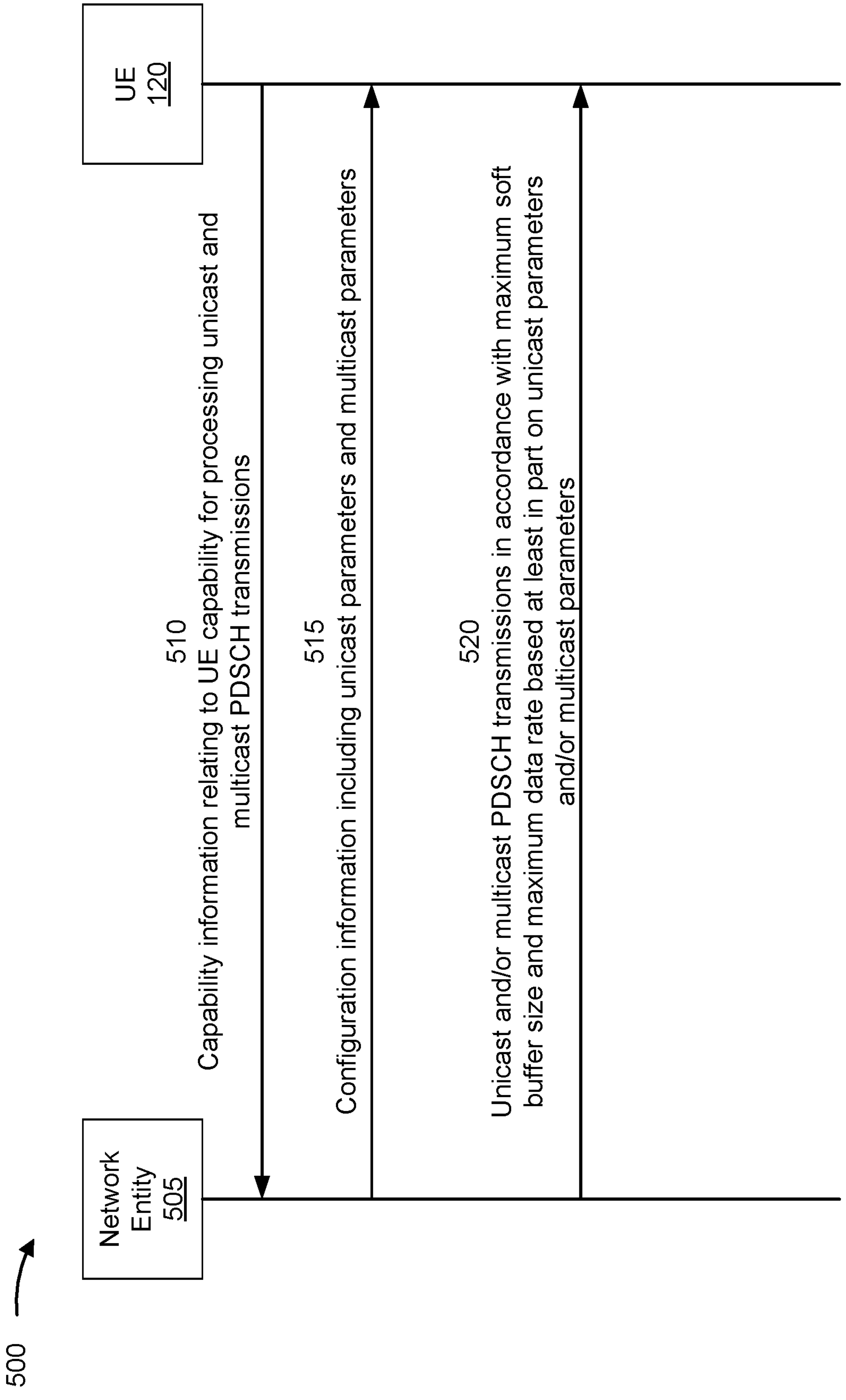
FIG. 5 is a diagram illustrating an example associated with a UE processing capability for multicast and unicast transmissions, in accordance with the present disclosure.

FIG. 5 is a diagram illustrating an example 500 associated with a UE processing capability for multicast and unicast transmissions, in accordance with the present disclosure. As shown in FIG. 5, example 500 includes communication between a network entity 505 (e.g., base station 110, CU 310, DU 330, RU 340, or a combination thereof) and a UE 120. In some aspects, the network entity 505 and the UE 120 may be included in a wireless network, such as wireless network 100. The network entity 505 and the UE 120 may communicate via a wireless access link, which may include an uplink and a downlink.

As shown in FIG. 5, and by reference number 510, the UE 120 may transmit, to the network entity 505, capability information relating to a capability of the UE 120 for processing unicast and multicast PDSCH transmissions. The network entity 505 may receive the capability information transmitted by the UE 120. For example, the UE 120 may transmit the capability information to the network entity 505 via an RRC message (or multiple RRC messages) or a MAC control element (MAC-CE) (or multiple MAC-CEs). In some aspects, the capability information may include an indication of whether the UE 120 supports (e.g., is capable of) receiving unicast and multicast PDSCH transmissions in a same slot.

In some aspects, the capability information may include an indication of a data rate scaling factor that relates to a processing capability of the UE 120. For example, the capability information may indicate a respective data rate scaling factor per frequency band or frequency band combination for one or more frequency bands or frequency band combinations. In some aspects, the data rate scaling factor may be a parameter (e.g., scalingFactor) indicated in a capability information report (e.g., FeatureSetDownlink) that indicates a set of features that the UE 120 supports on carriers corresponding to a band entry in a frequency band combination.

As further shown in FIG. 5, and by reference number 515, the network entity 505 may transmit configuration information that indicates unicast parameters for the UE 120 and multicast parameters for the UE 120. The UE 120 may receive the configuration information transmitted by the network entity 505. For example, the network entity 505 may transmit the configuration in an RRC message (or in multiple RRC messages). The unicast parameters may be parameters for unicast PDSCH transmissions to be transmitted to the UE 120, and the multicast parameters may be parameters for multicast PDSCH transmissions (e.g., GC-PDSCH transmissions) to be transmitted to the UE 120 (e.g., to a group of UEs including the UE 120).

In some aspects, the configuration information may include unicast parameters for a serving cell (e.g., parameters for unicast PDSCH transmissions in the serving cell). In some aspects, the unicast parameters may include one or more parameters included in or indicated by a unicast PDSCH serving cell configuration (e.g., PDSCH-ServingCellConfig) or a unicast PDSCH configuration in a dedicated BWP (e.g., PDSCH-Config in BWP-DownlinkDedicated). For example, the unicast parameters for a serving cell may indicate a maximum number of MIMO layers (e.g., maxMIMO-Layers) for unicast PDSCH transmissions, a maximum modulation order for unicast PDSCH transmissions, one or more configured downlink BWPs in the serving cell, a maximum number of PRBs of the configured downlink BWPs in the serving cell, and/or a unicast overhead parameter, among other examples. In some aspects, the unicast parameters may include an MCS table parameter, and the maximum modulation order for unicast PDSCH transmissions may be determined based at least in part on the MCS table parameter. In some aspects, the configuration information may include respective unicast parameters for multiple serving cells.

In some aspects, the configuration information may include multicast parameters for a serving cell (e.g., parameters for multicast PDSCH transmissions in the serving cell). In some aspects, the multicast parameters may include one or more parameters included in or indicated by a multicast PDSCH configuration (e.g., PDSCH-Config-Multicast). For example, the multicast parameters for a serving cell may indicate a maximum number of MIMO layers (e.g., maxMIMO-Layers) for multicast PDSCH transmissions, a maximum modulation order for multicast PDSCH transmissions, and/or a multicast overhead parameter, among other examples. In some aspects, the multicast parameters may include an MCS table parameter, and the maximum modulation order for multicast PDSCH transmissions may be determined based at least in part on the MCS table parameter. In some aspects, the multicast parameters may be configured in a common frequency resource (CFR) for multicast PDSCH transmissions. The CFR may be within a configured downlink BWP of the serving cell using the same SCS and CP. In some aspects, a maximum number of PRBs for multicast PDSCH transmissions may be based at least in part on the size of the CFR. In some aspects, the configuration information may include respective multicast parameters for multiple serving cells.

As further shown in FIG. 5, and by reference number 520, the network entity 505 may transmit unicast and/or multicast PDSCH transmissions in a slot in a serving cell. The UE 120 may receive the unicast and/or multicast PDSCH transmissions in the slot in the serving cell. In some aspects, the network entity 505 may transmit, and the UE 120 may receive, the unicast and/or multicast PDSCH transmissions in the slot in the serving cell in accordance with a maximum soft buffer size for the UE 120 and a maximum data rate for the UE 120 that are based at least in part on at least one of the unicast parameters or the multicast parameters.

In some aspects, in a case in which the UE 120 supports receiving multiplexed (e.g., frequency division multiplexed or time division multiplexed) unicast and multicast PDSCH transmissions in a slot in a serving cell, the network entity 505 may determine the maximum soft buffer size for LLR loading for the UE 120 and the maximum data rate for the UE 120 for a slot in the serving cell in which one or more unicast and/or multicast PDSCH transmissions are scheduled for the UE 120. Within an active BWP on the serving cell, the UE 120 may not be expected to handle (e.g., receive and/or decode) PDSCH TBs that exceed the maximum soft buffer size for the UE 120. For example, the network entity 505 may be required to schedule the unicast and/or multicast PDSCH transmissions in the slot in the serving cell such that the transmitted PDSCH TBs in the slot do not exceed the maximum soft buffer size for the UE 120. In some aspects, the UE 120 may determine the maximum soft buffer size for the UE 120, and the UE 120 may detect an error condition and/or select not to decode PDSCH TBs received in a slot in the serving cell in connection with a determination that the received PDSCH TBs exceed the maximum soft buffer size for the UE 120. In some aspects, within a cell group, the UE 120 may not be required to handle PDSCH transmissions that exceed the maximum data rate for the UE 120. For example, the network entity 505 may be required to schedule the unicast and/or multicast PDSCH transmissions in the slot in the serving cell such that PDSCH transmissions do not exceed the maximum data rate for the UE 120. In some aspects, the UE 120 may determine the maximum data rate for the UE 120, and the UE 120 may detect an error condition and/or select not to decode PDSCH transmissions received in a slot in the serving cell in connection with a determination that the received PDSCH transmissions exceed the maximum data rate for the UE 120.

In some aspects, $L_{unicast}$ may be a maximum soft buffer size determined based at least in part on the unicast parameters. For example, $L_{unicast}$ may be calculated as $$L_{unicast} = \left\lceil \frac{X_{unicast}}{4} \right\rceil \cdot \frac{1}{R_{LBRM}} \cdot TBS_{LBRM,unicast},$$

where $X_{unicast}$ is the maximum number of MIMO layers configured for unicast PDSCH communications for the serving cell, and $TBS_{LBRM,unicast}$ is the maximum TB size for unicast PDSCH communications for the serving cell determined based at least in part on the unicast parameters. In some aspects, $L_{multicast}$ may be a maximum soft buffer size determined based at least in part on the multicast parameters. For example, $L_{multicast}$ may be calculated as $$L_{multicast} = \left\lceil \frac{X_{multicast}}{4} \right\rceil \cdot \frac{1}{R_{LBRM}} \cdot TBS_{LBRM,multicast},$$

where $X_{multicast}$ is the maximum number of MIMO layers configured for multicast PDSCH communications for the serving cell, and $TBS_{LBRM,multicast}$ is the maximum TB size for multicast PDSCH communications for the serving cell determined based at least in part on the multicast parameters. In some aspects, $\text{DataRate}_{unicast}$ may be a maximum data rate determined based at least in part on the unicast parameters. For example, $\text{DataRate}_{unicast}$ (in Mbps) in serving cell j if configured with unicast transmission may be calculated as $$\text{DataRate}_{unicast} = 10^{-6} v_{Layers,unicast}^{(j)} \cdot Q_{m,unicast}^{(j)} \cdot f^{(j)} \cdot R_{max} \cdot \frac{N_{PRB}^{BW(j),\mu} \cdot 12}{T_{slot}^{\mu(j)}} \cdot \left(1 - OH^{(j)}\right),$$

where $$v_{Layers,unicast}^{(j)}$$

is the maximum number of layers for unicast PDSCH transmissions in the j-th serving cell and $$Q_{m,unicast}^{(j)}$$

is the maximum modulation order for unicast PDSCH transmissions in the j-th serving cell. In some aspects, $\text{DataRate}_{multicast}$ may be a maximum data rate determined based at least in part on the multicast parameters. For example, $\text{DataRate}_{multicast}$ (in Mbps) in serving cell j if configured with multicast transmission may be calculated as $$\text{DataRate}_{multicast} = 10^{-6} v_{Layers,multicast}^{(j)} \cdot Q_{m,multicast}^{(j)} \cdot f^{(j)} \cdot R_{max} \cdot \frac{N_{PRB}^{BW(j),\mu} \cdot 12}{T_{slot}^{\mu(j)}} \cdot (1 - \text{OH}^{(j)}),$$

where $$v_{Layers,multicast}^{(j)}$$

is the maximum number of layers for multicast PDSCH transmissions in the j-th serving cell and $$Q_{m,multicast}^{(j)}$$

is the maximum modulation order for multicast PDSCH transmissions in the j-th serving cell.

In some aspects, if the UE 120 is configured to support multiplexed (e.g., frequency division multiplexed or time division multiplexed) unicast and multicast PDSCH transmissions in a slot of a serving cell (e.g., CC), the maximum soft buffer size and/or the maximum data rate may be applied for all unicast and multicast PDSCH transmissions based at least in part on the unicast parameters. In some aspects, the maximum soft buffer size may be based at least in part on the unicast parameters. For example, the maximum soft buffer size may be $L_{unicast}$ for all unicast and multicast PDSCH transmissions in a slot. In this case, within an active BWP on a serving cell, for a slot with one or more unicast and/or multicast PDSCH transmissions, the UE 120 may not be expected to handle (e.g., receive and/or decode) one or more of the PDSCH transmissions if the following condition is not satisfied:

$$2^{max(0,\mu-\mu')} \cdot \sum_{i \in S} \left\lfloor \frac{C_i'}{L_i} \right\rfloor x_i \cdot F_i \leq L_{unicast}$$

with $S=S_{unicast}+S_{multicast}$ counting all multicast PDSCH transmissions ($S_{multicast}$) and unicast PDSCH transmissions ($S_{unicast}$) in the slot of the serving cell. If the UE does not report specific UE processing capability for a slot configured with unicast and/or multicast reception, the maximum soft buffer size may be $L_{unicast}$ for all unicast and multicast PDSCH transmissions in a slot by default.

In some aspects, the maximum data rate may be based at least in part on the unicast parameters and the capability information. For example, the maximum data rate may be $\text{DataRate}_{unicast}$ for all unicast and multicast PDSCH transmissions in a slot. In this case, within a cell group, for a slot with one or more unicast and/or multicast PDSCH transmissions, the UE 120 may not be required to handle (e.g., receive and/or decode) one or more of the PDSCH transmissions if the following condition is not satisfied:

$$\frac{\sum_{m=0}^{M-1} V_{j,m}}{T_{slot}^{\mu(j)}} \leq \text{DataRate}_{unicast}$$

with $M=M_{unicast}+M_{multicast}$ counting all multicast PDSCH TBs ($M_{multicast}$) and unicast PDSCH TBs ($M_{unicast}$) in slot $s_j$ in serving cell j. If the UE does not report specific UE processing capability for a slot configured with unicast and/or multicast reception, the maximum data rate may be $\text{DataRate}_{unicast}$ for all unicast and multicast PDSCH transmissions in a slot by default.

In some aspects, if the UE 120 is configured to support multiplexed (e.g., frequency division multiplexed or time division multiplexed) unicast and multicast PDSCH transmissions in a slot of a serving cell (e.g., CC), the maximum soft buffer size and/or the maximum data rate may be applied for all unicast and multicast PDSCH transmissions based at least in part on the unicast parameters and the multicast parameters. In some aspects, the maximum soft buffer size may be a maximum soft buffer size with a maximum value among a first maximum soft buffer size ($L_{unicast}$) that is based at least in part on the unicast parameters and a second maximum soft buffer size ($L_{multicast}$) that is based at least in part on the multicast parameters. In this case, within an active BWP on a serving cell, for a slot with one or more unicast and/or multicast PDSCH transmissions, the UE 120 may not be expected to handle (e.g., receive and/or decode) one or more of the PDSCH transmissions if the following condition is not satisfied:

$$2^{max(0,\mu-\mu')} \cdot \sum_{i \in S} \left\lfloor \frac{C_i'}{L_i} \right\rfloor x_i \cdot F_i \leq \max\{L_{unicast}, L_{multicast}\}$$

with $S=S_{unicast}+S_{multicast}$ counting all multicast PDSCH transmissions and unicast PDSCH transmissions in the slot of the serving cell. If the UE does not report specific UE processing capability for FDMed or TDMed unicast and multicast reception in a slot, the maximum soft buffer size may be $\max\{L_{unicast}, L_{multicast}\}$ for all unicast and multicast PDSCH transmissions in a slot by default.

In some aspects, the maximum data rate may be a maximum data rate with a maximum value among a first maximum data rate $\text{DataRate}_{unicast}$ that is based at least in part on the unicast parameters and a second maximum data rate $\text{DataRate}_{multicast}$ that is based at least in part on the multicast parameters. In this case, within a cell group, for a slot with one or more unicast and/or multicast PDSCH transmissions, the UE 120 may not be required to handle (e.g., receive and/or decode) one or more of the PDSCH transmissions if the following condition is not satisfied:

$$\frac{\sum_{m=0}^{M-1} V_{j,m}}{T_{slot}^{\mu(j)}} \leq \max\{\text{DataRate}_{unicast}, \text{DataRate}_{multicast}\}$$

with $M=M_{unicast}+M_{multicast}$ counting all multicast PDSCH TBs and unicast PDSCH TBs in slot $s_j$ in serving cell j. If the UE does not report specific UE processing capability for FDMed or TDMed unicast and multicast reception in a slot, the maximum data rate may be max{$DataRate_{unicast}$, $DataRate_{multicast}$} for all unicast and multicast PDSCH transmissions in a slot by default.

In some aspects, if the UE 120 is configured to support multiplexed (e.g., frequency division multiplexed or time division multiplexed) unicast and multicast PDSCH transmissions in a slot of a serving cell (e.g., CC), separate maximum soft buffer sizes and/or separate maximum data rates may be applied for unicast PDSCH transmissions (based on the unicast parameters) and multicast PDSCHs (based on the multicast parameters) with corresponding scaling factors. In some aspects, for a slot with only one or more unicast PDSCH transmissions, the maximum soft buffer size may be a first maximum soft buffer size ($L_{unicast}$) based at least in part on the unicast parameters. For a slot with only one or more multicast PDSCH transmissions, the maximum soft buffer size may be a second maximum soft buffer size ($L_{multicast}$) based at least in part on the multicast parameters. For a slot with one or more unicast PDSCH transmissions and one or more multicast PDSCH transmissions, the maximum soft buffer size may be a third maximum soft buffer size ($\alpha \cdot L_{unicast} + \beta \cdot L_{multicast}$) that is a sum of the first maximum soft buffer size scaled by a first scaling factor α and the second maximum soft buffer size scaled by a second scaling factor β. For example, α and may be RRC configured for the UE 120 with $0<\alpha\leq 1$ and $0<\beta\leq 1$ based at least in part on a reported processing capability of the UE 120. In some cases, α and β may be configured separately for FDMed unicast and multicast, and TDMed unicast and multicast in a slot based at least in part on a reported processing capability of the UE 120. In this case, within an active BWP on a serving cell, the UE 120 may not be expected to handle (e.g., receive and/or decode) one or more PDSCH transmissions if the following conditions are not satisfied:

For a slot with unicast only, $$2^{max(0,\mu-\mu')} \cdot \sum_{i \in S_{unicast}} \left\lfloor \frac{C_i'}{L_i} \right\rfloor x_i \cdot F_i \leq L_{unicast};$$

For a slot with multicast only, $$2^{max(0,\mu-\mu')} \cdot \sum_{i \in S_{multicast}} \left\lfloor \frac{C_i'}{L_i} \right\rfloor x_i \cdot F_i \leq L_{multicast};$$

For a slot with unicast and multicast, $$2^{max(0,\mu-\mu')} \cdot \sum_{i \in S} \left\lfloor \frac{C_i'}{L_i} \right\rfloor x_i \cdot F_i \leq \alpha \cdot L_{unicast} + \beta \cdot L_{multicast}.$$

In some aspects, for a slot with only one or more unicast PDSCH transmissions, the maximum data rate may be a first maximum data rate ($DataRate_{unicast}$) based at least in part on the unicast parameters. For a slot with only one or more multicast PDSCH transmissions, the maximum data rate may be a second maximum data rate ($DataRate_{multicast}$) based at least in part on the multicast parameters. For a slot with one or more unicast PDSCH transmissions and one or more multicast PDSCH transmissions, the maximum data rate may be a third maximum data rate (a $DataRate_{unicast}$+$\beta \cdot DataRate_{multicast}$) that is a sum of the first maximum data rate scaled by a first scaling factor α and the second maximum data rate scaled by a second scaling factor β. For example, α and β may be RRC configured for the UE 120 with $0<\alpha\leq 1$ and $0<\beta\leq 1$ based at least in part on a reported processing capability of the UE 120. In some cases, a and may be configured separately for FDMed unicast and multicast, and TDMed unicast and multicast in a slot based at least in part on a reported processing capability of the UE 120. In this case, within a cell group, the UE 120 may not be required to handle (e.g., receive and/or decode) one or more PDSCH transmissions if the following conditions are not satisfied:

For a slot with unicast only, $$\frac{\sum_{m=0}^{M_{unicast}-1} V_{j,m}}{T_{slot}^{\mu(j)}} \leq DataRate_{unicast};$$

For a slot with multicast only, $$\frac{\sum_{m=0}^{M_{multicast}-1} V_{j,m}}{T_{slot}^{\mu(j)}} \leq DataRate_{multicast};$$

For a slot with unicast and multicast, $$\frac{\sum_{m=0}^{M-1} V_{j,m}}{T_{slot}^{\mu(j)}} \leq \alpha \cdot DataRate_{unicast} + \beta \cdot DataRate_{multicast}.$$

In some aspects, if the UE 120 is configured to support multiplexed (e.g., frequency division multiplexed or time division multiplexed) unicast and multicast PDSCH transmissions in a slot of a serving cell (e.g., CC), the maximum soft buffer size and/or the maximum data rate applied for a slot that includes multicast PDSCH transmissions may be based at least in part on the unicast parameters and a scaling factor. In some aspects, for a slot with only one or more unicast PDSCH transmissions, the maximum soft buffer size may be a first maximum soft buffer size ($L_{unicast}$) based at least in part on the unicast parameters. For a slot with only one or more multicast PDSCH transmissions, the maximum soft buffer size may be a second maximum soft buffer size ($\gamma \cdot L_{unicast}$) that is a product of the first maximum soft buffer size ($L_{unicast}$) and a scaling factor γ. For a slot with one or more unicast PDSCH transmissions and one or more multicast PDSCH transmissions, the maximum soft buffer size may be a third maximum soft buffer size ($(1+\gamma) \cdot L_{unicast}$) that is a sum of the first maximum soft buffer size ($L_{unicast}$) and the second maximum soft buffer size ($\gamma \cdot L_{unicast}$) For example, γ may be RRC configured for the UE 120 with $0<\gamma<1$ based at least in part on a reported processing capability of the UE 120. In some cases, γ may be configured separately for FDMed unicast and multicast, and TDMed unicast and multicast in a slot based at least in part on a reported processing capability of the UE 120. In this case, within an active BWP on a serving cell, the UE 120 may not be expected to handle (e.g., receive and/or decode) one or more PDSCH transmissions if the following conditions are not satisfied:

For a slot with unicast only, $$2^{max(0,\mu-\mu')} \cdot \sum_{i \in S_{unicast}} \left\lfloor \frac{C_i'}{L_i} \right\rfloor x_i \cdot F_i \leq L_{unicast};$$

For a slot with multicast only, $$2^{max(0,\mu-\mu')}\cdot\Sigma_{i\in S_{multicast}}\left\lfloor\frac{C_i'}{L_i}\right\rfloor x_i\cdot F_i\le\gamma\cdot L_{unicast};$$

For a slot with unicast and multicast, $$2^{max(0,\mu-\mu')}\cdot\Sigma_{i\in S}\left\lfloor\frac{C_i'}{L_i}\right\rfloor x_i\cdot F_i\le(1+\gamma)\cdot L_{unicast}.$$

In some aspects, for a slot with only one or more unicast PDSCH transmissions, the maximum data rate may be a first maximum data rate ($\text{DataRate}_{unicast}$) based at least in part on the unicast parameters. For a slot with only one or more multicast PDSCH transmissions, the maximum data rate may be a second maximum data rate ($\gamma\cdot\text{DataRate}_{unicast}$) that is a product of the first maximum data rate ($\text{DataRate}_{unicast}$) and a scaling factor γ. For a slot with one or more unicast PDSCH transmissions and one or more multicast PDSCH transmissions, the maximum data rate may be a third maximum data rate ($(1+\gamma)\cdot\text{DataRate}_{unicast}$) that is a sum of the first maximum data rate ($\text{DataRate}_{unicast}$) and the second maximum data rate ($\gamma\cdot\text{DataRate}_{unicast}$). For example, γ may be RRC configured for the UE 120 with $0<\gamma<1$ based at least in part on a reported processing capability of the UE 120. In some cases, γ may be configured separately for FDMed unicast and multicast, and TDMed unicast and multicast in a slot based at least in part on a reported processing capability of the UE 120. In this case, within a cell group, the UE 120 may not be required to handle (e.g., receive and/or decode) one or more PDSCH transmissions if the following conditions are not satisfied:

For a slot with unicast only, $$\frac{\Sigma_{m=0}^{M_{unicast}-1}V_{j,m}}{T_{slot}^{\mu(j)}}\le\text{DataRate}_{unicast};$$

For a slot with multicast only, $$\frac{\Sigma_{m=0}^{M_{multicast}-1}V_{j,m}}{T_{slot}^{\mu(j)}}\le\gamma\cdot\text{DataRate}_{unicast};$$

For a slot with unicast and multicast, $$\frac{\Sigma_{m=0}^{M-1}V_{j,m}}{T_{slot}^{\mu(j)}}\le(1+\gamma)\cdot\text{DataRate}_{unicast}.$$

In some aspects, if the UE 120 is configured to support multiplexed (e.g., frequency division multiplexed or time division multiplexed) unicast and multicast PDSCH transmissions in a slot of a serving cell (e.g., CC), the maximum soft buffer size and/or the maximum data rate applied for unicast PDSCH and multicast PDSCH transmissions may be based at least in part on the unicast parameters and a scaling factor determined from a unicast and multicast resource allocation. In some aspects, for a slot with one or more unicast PDSCH transmissions and one or more multicast PDSCH transmissions, the maximum soft buffer size may be a first maximum soft buffer size ($L_{unicast}$) based at least in part on the unicast parameters. For a slot with only one or more unicast PDSCH transmissions, the maximum soft buffer size may be a second maximum soft buffer size ($\alpha\cdot L_{unicast}$) based at least in part on the first maximum soft buffer size ($L_{unicast}$) and a scaling factor α. For a slot with only one or more multicast PDSCH transmissions, the maximum soft buffer size may be a third maximum soft buffer size ($(1-\alpha)\cdot L_{unicast}$) based at least in part on the first maximum soft buffer size ($L_{unicast}$) and the scaling factor α. For example, α may be determined by a ratio of resource elements (REs) allocated for unicast PDSCH transmissions within a lot relative to the total REs allocated for unicast and PDSCH transmissions within the lot. In this case, within an active BWP on a serving cell, the UE 120 may not be expected to handle (e.g., receive and/or decode) one or more PDSCH transmissions if the following conditions are not satisfied:

For a slot with unicast only, $$2^{max(0,\mu-\mu')}\cdot\Sigma_{i\in S_{unicast}}\left\lfloor\frac{C_i'}{L_i}\right\rfloor x_i\cdot F_i\le\alpha\cdot L_{unicast};$$

For a slot with multicast only, $$2^{max(0,\mu-\mu')}\cdot\Sigma_{i\in S_{multicast}}\left\lfloor\frac{C_i'}{L_i}\right\rfloor x_i\cdot F_i\le(1-\alpha)\cdot L_{unicast};$$

For a slot with unicast and multicast, $$2^{max(0,\mu-\mu')}\cdot\Sigma_{i\in S}\left\lfloor\frac{C_i'}{L_i}\right\rfloor x_i\cdot F_i\le L_{unicast}.$$

In some aspects, for a slot with one or more unicast PDSCH transmissions and one or more multicast PDSCH transmissions, the maximum data rate may be a first maximum data rate ($\text{DataRate}_{unicast}$) based at least in part on the unicast parameters. For a slot with only one or more unicast PDSCH transmissions, the maximum data rate may be a second maximum data rate (a $\text{DataRate}_{unicast}$) based at least in part on the first maximum data rate ($\text{DataRate}_{unicast}$) and a scaling factor α. For a slot with only one or more multicast PDSCH transmissions, the maximum data rate may be a third maximum data rate ($(1-\alpha)\cdot\text{DataRate}_{unicast}$) based a at least in part on the first maximum data rate ($\text{DataRate}_{unicast}$) and a scaling factor α. For example, α may be determined by a ratio of REs allocated for unicast PDSCH transmissions within a lot relative to the total REs allocated for unicast and PDSCH transmissions within the lot. In this case, within a cell group, the UE 120 may not be required to handle (e.g., receive and/or decode) one or more PDSCH transmissions if the following conditions are not satisfied:

For a slot with unicast only, $$\frac{\Sigma_{m=0}^{M_{unicast}-1}V_{j,m}}{T_{slot}^{\mu(j)}}\le\alpha\cdot\text{DataRate}_{unicast};$$

For a slot with multicast only, $$\frac{\Sigma_{m=0}^{M_{multicast}-1}V_{j,m}}{T_{slot}^{\mu(j)}}\le(1-\alpha)\cdot\text{DataRate}_{unicast};$$

For a slot with unicast and multicast $$\frac{\sum_{m=0}^{M-1} V_{j,m}}{T_{slot}^{\mu(j)}} \leq \text{DataRate}_{unicast}.$$

In some aspects, the maximum data rate applied for a slot with unicast and multicast PDSCH transmissions may be based at least in part on a scaling factor, indicated in the capability information, that relates to a unicast and multicast processing capability of the UE 120. In some aspects, the capability information, transmitted by the UE 120 to the network entity 505, may include an indication of a first data rate scaling factor $$f_{unicast}^{(j)}$$

relating to a unicast processing capability of the UE 120 and an indication of a second data rate scaling factor $$f_{unicsat+multicast}^{(j)}$$

relating to a unicast and multicast processing capability of the UE 120. The first data rate scaling factor $$f_{unicast}^{(j)}$$

and the second data rate scaling factor $$f_{unicsat+multicast}^{(j)}$$

may be indicated per band and/or per band combination. For example, $$f_{unicast}^{(j)}$$

may be indicated by a first higher layer scaling factor parameter (e.g., scalingFactor) configured in a capability information report (e.g., FeatureSetDownlink) that indicates a set of features that the UE 120 supports on carriers corresponding to a band entry in a frequency band combination, and $$f_{unicsat+multicast}^{(j)}$$

may be indicated by a second higher layer scaling factor parameter (e.g., scalingFactor_UnicastMulticast) configured in the capability information report (e.g., FeatureSetDownlink) that indicates the set of features that the UE 120 supports on carriers corresponding to a band entry in a frequency band combination. A value for $$f_{unicast}^{(j)}$$

may be selected (e.g., by the UE 120) from a first set of values $$\left(\text{e.g., } f_{unicsat}^{(j)} = \{1, 0.8, 0.75, 0.4\}\right),$$

and a value for $$f_{unicsat+multicast}^{(j)}$$

may be selected (e.g., by the UE 120) from a second set of values $$\left(\text{e.g., } f_{unicsat+multicast}^{(j)} = \{1.6, 1.25, 1, 0.75,\}\right).$$

In some aspects, the value for $$f_{unicsat+multicast}^{(j)}$$

may be larger than 1. In some cases, $$f_{unicsat+multicast}^{(j)}$$

may be configured separately for FDMed unicast and multicast, and TDMed unicast and multicast in a slot based at least in part on a reported processing capability of the UE 120.

In some aspects, for a slot with only one or more unicast PDSCH transmissions, the maximum data rate may be a first maximum data rate ($\text{DataRate}_{unicast}$) based at least in part on the unicast parameters and the first data rate scaling factor $$f_{unicsat}^{(j)}.$$

For example, in this case, $\text{DataRate}_{unicast}$ (in Mbps) in serving cell j may be calculated as $$\text{DataRate}_{unicast} = 10^{-6} v_{Layers,unicast}^{(j)} \cdot Q_{m,unicast}^{(j)} \cdot f_{unicast}^{(j)} \cdot R_{max} \cdot \frac{N_{PRB}^{BW(j),\mu} \cdot 12}{T_{slot}^{\mu(j)}} \cdot \left(1 - \text{OH}^{(j)}\right).$$

The maximum data rate may also be the first maximum data rate ($\text{DataRate}_{unicast}$) for a slot with only one or more multicast PDSCH transmissions. For a slot with one or more unicast PDSCH transmissions and one or more multicast PDSCH transmissions, the maximum data rate may be a second maximum data rate ($\text{DataRate}_{unicast+multicast}$) based at least in part on the unicast parameters and the second data rate scaling factor $$f_{unicsat+multicast}^{(j)}.$$

For example, $DataRate_{unicast+multicast}$ (in Mbps) in serving cell j may be calculated as $$DataRate_{unicast+multicast} = 10^{-6} v^{(j)}_{Layers,unicsat} \cdot Q^{(j)}_{m,unicsat} \cdot f^{(j)}_{unicsat+multicast} \cdot R_{max} \cdot \frac{N^{BW(j),\mu}_{PRB} \cdot 12}{T^{\mu(j)}_{slot}} \cdot (1 - OH^{(j)}).$$

In this case, within a cell group, the UE 120 may not be required to handle (e.g., receive and/or decode) one or more PDSCH transmissions if the following conditions are not satisfied:

For a slot with unicast only, $$\Sigma_{j=0}^{J-1} \frac{\Sigma_{m=0}^{M_{unicast}-1} V_{j,m}}{T^{\mu(j)}_{slot}} \leq \Sigma_{j=0}^{J-1} DataRate_{unicast};$$

For a slot with multicast only, $$\sum_{j=0}^{J-1} \frac{\Sigma_{m=0}^{M_{multicast}-1} V_{j,m}}{T^{\mu(j)}_{slot}} \leq \sum_{j=0}^{J-1} DataRate_{unicast};$$

For a slot with unicast and multicast, $$\sum_{j=0}^{J-1} \frac{\Sigma_{m=0}^{M-1} V_{j,m}}{T^{\mu(j)}_{slot}} \leq \sum_{j=0}^{J-1} DataRate_{unicast+multicast},$$

with $M=M_{unicast}+M_{multicast}$.

In some aspects, the maximum data rate applied for a slot with multicast PDSCH transmissions may be based at least in part on a scaling factor, indicated in the capability information, that relates to a multicast processing capability of the UE 120. In some aspects, the capability information, transmitted by the UE 120 to the network entity 505, may include an indication of a first data rate scaling factor $$f^{(j)}_{unicast}$$

relating to a unicast processing capability of the UE 120 and an indication of a second data rate scaling factor $$f^{(j)}_{multicast}$$

relating to a multicast processing capability of the UE 120. The first data rate scaling factor $$f^{(j)}_{unicast}$$

and the second data rate scaling factor $$f^{(j)}_{multicast}$$

may be indicated per band and/or per band combination. For example, $$f^{(j)}_{unicast}$$

may be indicated by a first higher layer scaling factor parameter (e.g., scalingFactor) configured in a capability information report (e.g., FeatureSetDownlink) that indicates a set of features that the UE 120 supports on carriers corresponding to a band entry in a frequency band combination, and $$f^{(j)}_{multicast}$$

may be indicated by a second higher layer scaling factor parameter (e.g., scalingFactor_Multicast) configured in the capability information report (e.g., FeatureSetDownlink) that indicates the set of features that the UE 120 supports on carriers corresponding to a band entry in a frequency band combination. A value for $$f^{(j)}_{unicast}$$

may be selected (e.g., by the UE 120) from a first set of values $$\left(\text{e.g., } f^{(j)}_{unicsat} = \{1, 0.8, 0.75, 0.4\}\right),$$

and a value for $$f^{(j)}_{multicast}$$

may be selected (e.g., by the UE 120) from a second set of values $$\left(\text{e.g., } f^{(j)}_{multicast} = \{1, 0.75, 0.4, 0.2\}\right).$$

In some aspects, for a slot with only one or more unicast PDSCH transmissions, the maximum data rate may be a first maximum data rate ($DataRate_{unicast}$) based at least in part on the unicast parameters and the first data rate scaling factor $$f^{(j)}_{unicsat}.$$

For example, in this case, $DataRate_{unicast}$ may be calculated as $$DataRate_{unicast} = 10^{-6}\left(v^{(j)}_{Layers,unicast} \cdot Q^{(j)}_{m,unicast} \cdot f^{(j)}_{unicast} \cdot R_{max} \cdot \frac{N^{BW(j),\mu}_{PRB} \cdot 12}{T^{\mu(j)}_{slot}} \cdot (1 - OH^{(j)})\right).$$

For a slot with only one or more multicast PDSCH transmissions, the maximum data rate may be a second maximum data rate ($DataRate_{multicast}$) based at least in part on the multicast parameters and the second data rate scaling factor $$f_{multicast}^{(j)}$$

For example, $DataRate_{multicast}$ may be calculated as $$DataRate_{multicast} = 10^{-6}\left(v_{Layers,multicast}^{(j)} \cdot Q_{m,multicast}^{(j)} \cdot f_{multicast}^{(j)} \cdot R_{max} \cdot \frac{N_{PRB}^{BW(j),\mu} \cdot 12}{T_{slot}^{\mu(j)}} \cdot \left(1 - OH^{(j)}\right)\right).$$

For a slot with one or more unicast PDSCH transmissions and one or more multicast PDSCH transmissions, the maximum data rate may be a third maximum data rate ($DataRate_{unicast}+DataRate_{multicast}$) that is a sum of the first maximum data rate ($DataRate_{unicast}$) and the second maximum data rate $DataRate_{multicast}$. In this case, within a cell group, the UE 120 may not be required to handle (e.g., receive and/or decode) one or more PDSCH transmissions if the following conditions are not satisfied:

For a slot with unicast only, $$\sum_{j=0}^{J-1} \frac{\sum_{m=0}^{M_{unicast}-1} V_{j,m}}{T_{slot}^{\mu(j)}} \leq \sum_{j=0}^{J-1} DataRate_{unicast};$$

For a slot with multicast only, $$\sum_{j=0}^{J-1} \frac{\sum_{m=0}^{M_{multicast}-1} V_{j,m}}{T_{slot}^{\mu(j)}} \leq \sum_{j=0}^{J-1} DataRate_{multicast};$$

For a slot with unicast and multicast, $$\sum_{j=0}^{J-1} \frac{\sum_{m=0}^{M-1} V_{j,m}}{T_{slot}^{\mu(j)}} \leq \sum_{j=0}^{J-1} (DataRate_{unicast} + DataRate_{multicast}),$$

with $M = M_{unicast} + M_{multicast}$.

As indicated above, FIG. 5 is provided as an example. Other examples may differ from what is described with respect to FIG. 5.

Figure 6:
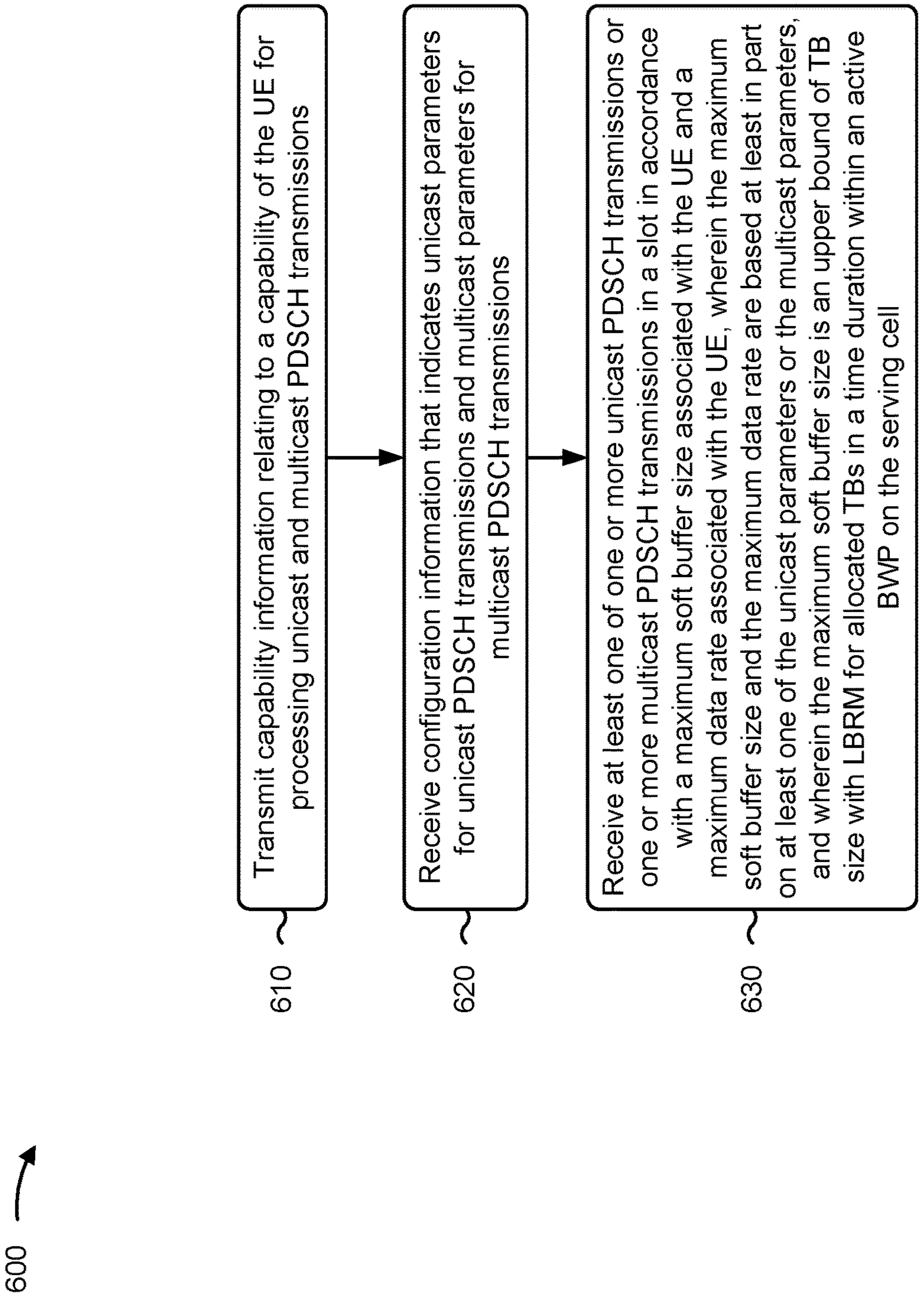
FIGS. 6-7 are diagrams illustrating example processes associated with a UE processing capability for multicast and unicast transmissions, in accordance with the present disclosure.

FIG. 6 is a diagram illustrating an example process 600 performed, for example, by a UE, in accordance with the present disclosure. Example process 600 is an example where the UE (e.g., UE 120) performs operations associated with a UE 120 processing capability for multicast and unicast transmissions.

As shown in FIG. 6, in some aspects, process 600 may include transmitting, to a network entity, capability information relating to a capability of the UE for processing unicast and multicast PDSCH transmissions (block 610). For example, the UE (e.g., using communication manager 140 and/or transmission component 804, depicted in FIG. 8) may transmit, to a network entity, capability information relating to a capability of the UE for processing unicast and multicast PDSCH transmissions, as described above.

As further shown in FIG. 6, in some aspects, process 600 may include receiving, from the network entity, configuration information that indicates unicast parameters for unicast PDSCH transmissions and multi cast parameters for multicast PDSCH transmissions (block 620). For example, the UE (e.g., using communication manager 140 and/or reception component 802, depicted in FIG. 8) may receive, from the network entity, configuration information that indicates unicast parameters for unicast PDSCH transmissions and multicast parameters for multicast PDSCH transmissions, as described above.

As further shown in FIG. 6, in some aspects, process 600 may include receiving at least one of one or more unicast PDSCH transmissions or one or more multicast PDSCH transmissions in a slot in a serving cell in accordance with a maximum soft buffer size associated with the UE and a maximum data rate associated with the UE, wherein the maximum soft buffer size and the maximum data rate are based at least in part on at least one of the unicast parameters or the multicast parameters, and wherein the maximum soft buffer size is an upper bound of TB size with LBRM for allocated TBs in a time duration within an active BWP on the serving cell (block 630). For example, the UE (e.g., using communication manager 140 and/or reception component 802, depicted in FIG. 8) may receive at least one of one or more unicast PDSCH transmissions or one or more multicast PDSCH transmissions in a slot in a serving cell in accordance with a maximum soft buffer size associated with the UE and a maximum data rate associated with the UE, wherein the maximum soft buffer size and the maximum data rate are based at least in part on at least one of the unicast parameters or the multicast parameters, and wherein the maximum soft buffer size is an upper bound of TB size with LBRM for allocated TBs in a time duration within an active BWP on the serving cell as described above.

Process 600 may include additional aspects, such as any single aspect or any combination of aspects described below and/or in connection with one or more other processes described elsewhere herein.

In a first aspect, the maximum soft buffer size is based at least in part on the unicast parameters.

In a second aspect, receiving the at least one of the one or more unicast PDSCH transmissions or the one or more multicast PDSCH transmissions in the slot in the serving cell includes receiving the one or more multicast PDSCH transmissions in the slot in the serving cell in accordance with the maximum soft buffer size that is based at least in part on the unicast parameters, or receiving the one or more unicast PDSCH transmissions and the one or more multicast PDSCH transmissions in the slot in the serving cell in accordance with the maximum soft buffer size that is based at least in part on the unicast parameters.

In a third aspect, the maximum data rate is based at least in part on the unicast parameters and the capability information.

In a fourth aspect, receiving the at least one of the one or more unicast PDSCH transmissions or the one or more multicast PDSCH transmissions in the slot in the serving cell includes receiving the one or more multicast PDSCH transmissions in the slot in the serving cell in accordance with the maximum data rate that is based at least in part on the unicast parameters and the capability information, or receiving the one or more unicast PDSCH transmissions and the one or more multicast PDSCH transmissions in the slot in the serving cell in accordance with the maximum data rate that is based at least in part on the unicast parameters and the capability information.

In a fifth aspect, the maximum soft buffer size is a maximum soft buffer size with a maximum value among a first maximum soft buffer size that is based at least in part on the unicast parameters and a second maximum soft buffer size that is based at least in part on the multicast parameters.

In a sixth aspect, the maximum data rate is a maximum data rate with a maximum value among a first maximum data rate that is based at least in part on the unicast parameters and a second maximum data rate that is based at least in part on the multicast parameters.

In a seventh aspect, receiving the at least one of the one or more unicast PDSCH transmissions or the one or more multicast PDSCH transmissions in the slot in the serving cell includes receiving only the one or more unicast PDSCH transmissions in the slot in the serving cell in accordance with a first maximum soft buffer size based at least in part on the unicast parameters, receiving only the one or more multicast PDSCH transmissions in the slot in the serving cell in accordance with a second maximum soft buffer size based at least in part on the multicast parameters, or receiving the one or more unicast PDSCH transmissions and the one or more multicast PDSCH transmissions in the slot in the serving cell in accordance with a third maximum soft buffer size that is a sum of the first maximum soft buffer size scaled by a first scaling factor and the second maximum soft buffer size scaled by a second scaling factor.

In an eighth aspect, receiving the at least one of the one or more unicast PDSCH transmissions or the one or more multicast PDSCH transmissions in the slot in the serving cell includes receiving only the one or more unicast PDSCH transmissions in the slot in the serving cell in accordance with a first maximum data rate based at least in part on the unicast parameters, receiving only the one or more multicast PDSCH transmissions in the slot in the serving cell in accordance with a second maximum data rate based at least in part on the multicast parameters, or receiving the one or more unicast PDSCH transmissions and the one or more multicast PDSCH transmissions in the slot in the serving cell in accordance with a third maximum data rate that is a sum of the first maximum data rate scaled by a first scaling factor and the second maximum data rate scaled by a second scaling factor.

In a ninth aspect, receiving the at least one of the one or more unicast PDSCH transmissions or the one or more multicast PDSCH transmissions in the slot in the serving cell includes receiving only the one or more unicast PDSCH transmissions in the slot in the serving cell in accordance with a first maximum soft buffer size based at least in part on the unicast parameters, receiving only the one or more multicast PDSCH transmissions in the slot in the serving cell in accordance with a second maximum soft buffer size that is a product of the first maximum soft buffer size and a scaling factor, or receiving the one or more unicast PDSCH transmissions and the one or more multicast PDSCH transmissions in the slot in the serving cell in accordance with a third maximum soft buffer size that is a sum of the first maximum soft buffer size and the second maximum soft buffer size.

In a tenth aspect, receiving the at least one of the one or more unicast PDSCH transmissions or the one or more multicast PDSCH transmissions in the slot in the serving cell includes receiving only the one or more unicast PDSCH transmissions in the slot in the serving cell in accordance with a first maximum data rate based at least in part on the unicast parameters, receiving only the one or more multicast PDSCH transmissions in the slot in the serving cell in accordance with a second maximum data rate that is a product of the first maximum data rate and a scaling factor, or receiving the one or more unicast PDSCH transmissions and the one or more multicast PDSCH transmissions in the slot in the serving cell in accordance with a third maximum data rate that is a sum of the first maximum data rate and the second maximum data rate.

In an eleventh aspect, receiving the at least one of the one or more unicast PDSCH transmissions or the one or more multicast PDSCH transmissions in the slot in the serving cell includes receiving the one or more unicast PDSCH transmissions and the one or more multicast PDSCH transmissions in the slot in the serving cell in accordance with a first maximum soft buffer size based at least in part on the unicast parameters, receiving only the one or more unicast PDSCH transmissions in the slot in the serving cell in accordance with a second maximum soft buffer size based at least in part on the first maximum soft buffer size and a scaling factor, or receiving only the one or more multicast PDSCH transmissions in the slot in the serving cell in accordance with a third maximum soft buffer size based at least in part on the first maximum soft buffer size and the scaling factor, where the scaling factor is based at least in part on a unicast and multicast resource allocation.

In a twelfth aspect, receiving the at least one of the one or more unicast PDSCH transmissions or the one or more multicast PDSCH transmissions in the slot in the serving cell includes receiving the one or more unicast PDSCH transmissions and the one or more multicast PDSCH transmissions in the slot in the serving cell in accordance with a first maximum data rate based at least in part on the unicast parameters, receiving only the one or more unicast PDSCH transmissions in the slot in the serving cell in accordance with a second maximum data rate based at least in part on the first maximum data rate and a scaling factor, or receiving only the one or more multicast PDSCH transmissions in the slot in the serving cell in accordance with a third maximum data rate based at least in part on the first maximum data rate and the scaling factor, where the scaling factor is based at least in part on a unicast and multicast resource allocation.

In a thirteenth aspect, the capability information includes an indication of a first data rate scaling factor relating to a unicast processing capability of the UE and an indication of a second data rate scaling factor relating to a unicast and multicast processing capability of the UE.

In a fourteenth aspect, receiving the at least one of the one or more unicast PDSCH transmissions or the one or more multicast PDSCH transmissions in the slot in the serving cell includes receiving only the one or more unicast PDSCH transmissions in the slot in the serving cell in accordance with a first maximum data rate based at least in part on the unicast parameters and the first data rate scaling factor, receiving only the one or more multicast PDSCH transmissions in the slot in the serving cell in accordance with the first maximum data rate, or receiving the one or more unicast PDSCH transmissions and the one or more multicast PDSCH transmissions in the slot in the serving cell in accordance with a second maximum data rate based at least in part on the unicast parameters and the second data rate scaling factor.

In a fifteenth aspect, the capability information includes an indication of a first data rate scaling factor relating to a unicast processing capability of the UE and an indication of a second data rate scaling factor relating to a multicast processing capability of the UE.

In a sixteenth aspect, receiving the at least one of the one or more unicast PDSCH transmissions or the one or more multicast PDSCH transmissions in the slot in the serving cell includes receiving only the one or more unicast PDSCH transmissions in the slot in the serving cell in accordance with a first maximum data rate based at least in part on the unicast parameters and the first data rate scaling factor, receiving only the one or more multicast PDSCH transmissions in the slot in the serving cell in accordance with a second maximum data rate based at least in part on the multicast parameters and the second data rate scaling factor, or receiving the one or more unicast PDSCH transmissions and the one or more multicast PDSCH transmissions in the slot in accordance with a third maximum data rate that is a sum of the first maximum data rate and the second maximum data rate.

In a seventeenth aspect, the maximum soft buffer size is based at least in part on the unicast parameters, and the maximum data rate is based at least in part on the unicast parameters.

In an eighteenth aspect, the one or more unicast PDSCH transmissions and the one or more multicast PDSCH transmissions are frequency division multiplexed in the slot in the serving cell.

In a nineteenth aspect, the maximum soft buffer size is an upper bound of TB size with LBRM for allocated TBs in a 14 consecutive-symbol duration for a normal CP, or a 12 consecutive-symbol duration for an extended CP, ending at a last symbol of a latest PDSCH transmission within the active BWP on the serving cell.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
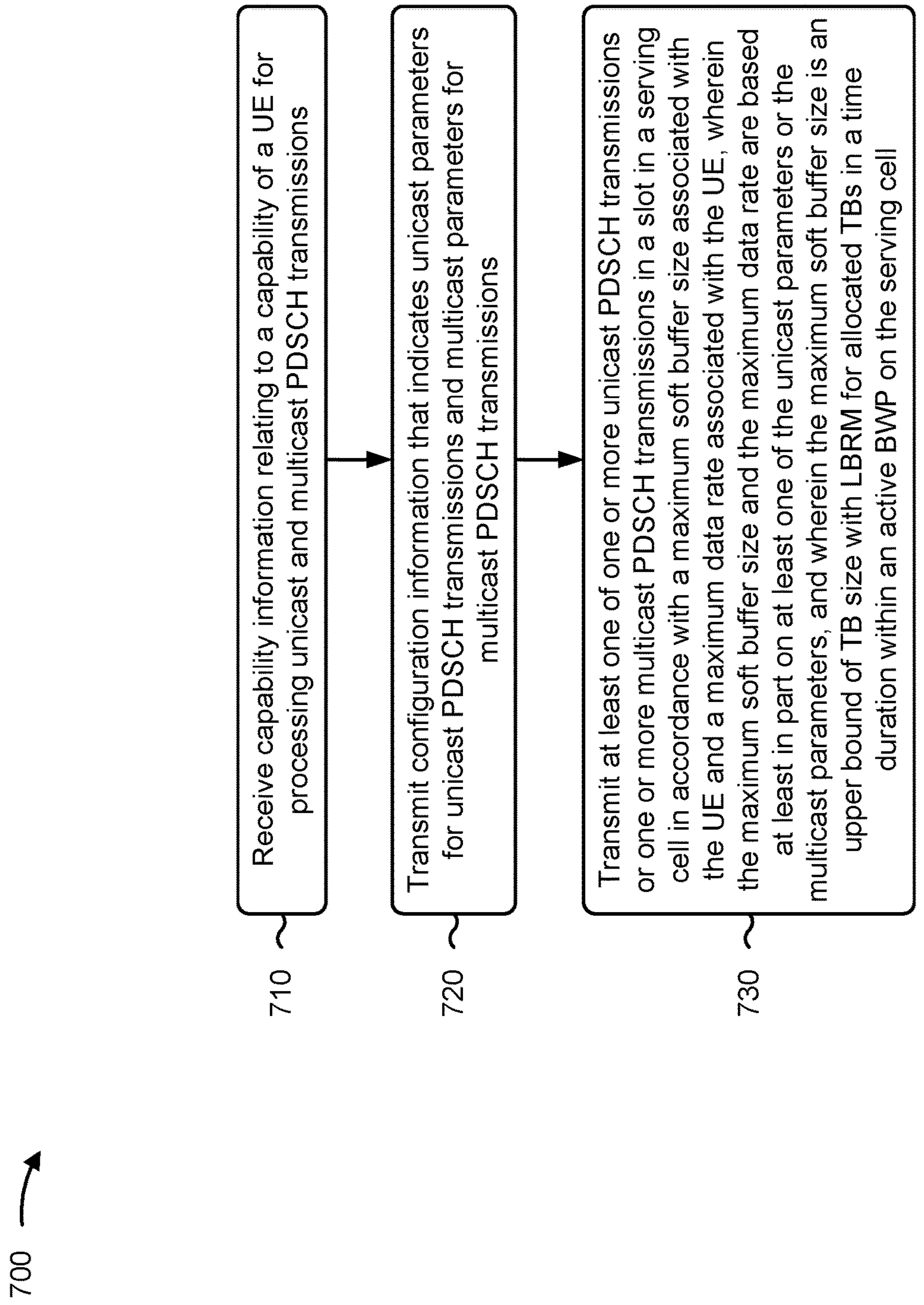

FIG. 7 is a diagram illustrating an example process 700 performed, for example, by a network entity, in accordance with the present disclosure. Example process 700 is an example where the network entity (e.g., network entity 505, base station 110, CU 310, DU 330, RU 340, or a combination thereof) performs operations associated with a UE processing capability for multicast and unicast transmissions.

As shown in FIG. 7, in some aspects, process 700 may include receiving capability information relating to a capability of a UE for processing unicast and multicast PDSCH transmissions (block 710). For example, the network entity (e.g., using communication manager 908 and/or reception component 902, depicted in FIG. 9) may receive capability information relating to a capability of a UE for processing unicast and multicast PDSCH transmissions, as described above.

As further shown in FIG. 7, in some aspects, process 700 may include transmitting configuration information that indicates unicast parameters for unicast PDSCH transmissions and multicast parameters for multicast PDSCH transmissions (block 720). For example, the network entity (e.g., using communication manager 908 and/or transmission component 904, depicted in FIG. 9) may transmit configuration information that indicates unicast parameters for unicast PDSCH transmissions and multicast parameters for multicast PDSCH transmissions, as described above.

As further shown in FIG. 7, in some aspects, process 700 may include transmitting at least one of one or more unicast PDSCH transmissions or one or more multicast PDSCH transmissions in a slot in a serving cell in accordance with a maximum soft buffer size associated with the UE and a maximum data rate associated with the UE, wherein the maximum soft buffer size and the maximum data rate are based at least in part on at least one of the unicast parameters or the multicast parameters, and wherein the maximum soft buffer size is an upper bound of TB size with LBRM for allocated TBs in a time duration within an active BWP on the serving cell (block 730). For example, the network entity (e.g., using communication manager 908 and/or transmission component 904, depicted in FIG. 9) may transmit at least one of one or more unicast PDSCH transmissions or one or more multicast PDSCH transmissions in a slot in a serving cell in accordance with a maximum soft buffer size associated with the UE and a maximum data rate associated with the UE, wherein the maximum soft buffer size and the maximum data rate are based at least in part on at least one of the unicast parameters or the multicast parameters, and wherein the maximum soft buffer size is an upper bound of TB size with LBRM for allocated TBs in a time duration within an active BWP on the serving cell as described above.

Process 700 may include additional aspects, such as any single aspect or any combination of aspects described below and/or in connection with one or more other processes described elsewhere herein.

In a first aspect, the maximum soft buffer size is based at least in part on the unicast parameters.

In a second aspect, transmitting the at least one of the one or more unicast PDSCH transmissions or the one or more multicast PDSCH transmissions in the slot in the serving cell includes transmitting the one or more multicast PDSCH transmissions in the slot in the serving cell in accordance with the maximum soft buffer size that is based at least in part on the unicast parameters, or transmitting the one or more unicast PDSCH transmissions and the one or more multicast PDSCH transmissions in the slot in the serving cell in accordance with the maximum soft buffer size that is based at least in part on the unicast parameters.

In a third aspect, the maximum data rate is based at least in part on the unicast parameters and the capability information.

In a fourth aspect, transmitting the at least one of the one or more unicast PDSCH transmissions or the one or more multicast PDSCH transmissions in the slot in the serving cell includes transmitting the one or more multicast PDSCH transmissions in the slot in the serving cell in accordance with the maximum data rate that is based at least in part on the unicast parameters and the capability information, or transmitting the one or more unicast PDSCH transmissions and the one or more multicast PDSCH transmissions in the slot in the serving cell in accordance with the maximum data rate that is based at least in part on the unicast parameters and the capability information.

In a fifth aspect, the maximum soft buffer size is a maximum soft buffer size with a maximum value among a first maximum soft buffer size that is based at least in part on the unicast parameters and a second maximum soft buffer size that is based at least in part on the multicast parameters.

In a sixth aspect, the maximum data rate is a maximum data rate with a maximum value among a first maximum data rate that is based at least in part on the unicast parameters and a second maximum data rate that is based at least in part on the multicast parameters.

In a seventh aspect, transmitting the at least one of the one or more unicast PDSCH transmissions or the one or more multicast PDSCH transmissions in the slot in the serving cell includes transmitting only the one or more unicast PDSCH transmissions in the slot in the serving cell in accordance with a first maximum soft buffer size based at least in part on the unicast parameters, transmitting only the one or more multicast PDSCH transmissions in the slot in the serving cell in accordance with a second maximum soft buffer size based at least in part on the multicast parameters, or transmitting the one or more unicast PDSCH transmissions and the one or more multicast PDSCH transmissions in the slot in the serving cell in accordance with a third maximum soft buffer size that is a sum of the first maximum soft buffer size scaled by a first scaling factor and the second maximum soft buffer size scaled by a second scaling factor.

In an eighth aspect, transmitting the at least one of the one or more unicast PDSCH transmissions or the one or more multicast PDSCH transmissions in the slot in the serving cell includes transmitting only the one or more unicast PDSCH transmissions in the slot in the serving cell in accordance with a first maximum data rate based at least in part on the unicast parameters, transmitting only the one or more multicast PDSCH transmissions in the slot in the serving cell in accordance with a second maximum data rate based at least in part on the multicast parameters, or transmitting the one or more unicast PDSCH transmissions and the one or more multicast PDSCH transmissions in the slot in the serving cell in accordance with a third maximum data rate that is a sum of the first maximum data rate scaled by a first scaling factor and the second maximum data rate scaled by a second scaling factor.

In a ninth aspect, transmitting the at least one of the one or more unicast PDSCH transmissions or the one or more multicast PDSCH transmissions in the slot in the serving cell includes transmitting only the one or more unicast PDSCH transmissions in the slot in the serving cell in accordance with a first maximum soft buffer size based at least in part on the unicast parameters, transmitting only the one or more multicast PDSCH transmissions in the slot in the serving cell in accordance with a second maximum soft buffer size that is a product of the first maximum soft buffer size and a scaling factor, or transmitting the one or more unicast PDSCH transmissions and the one or more multicast PDSCH transmissions in the slot in the serving cell in accordance with a third maximum soft buffer size that is a sum of the first maximum soft buffer size and the second maximum soft buffer size.

In a tenth aspect, transmitting the at least one of the one or more unicast PDSCH transmissions or the one or more multicast PDSCH transmissions in the slot in the serving cell includes transmitting only the one or more unicast PDSCH transmissions in the slot in the serving cell in accordance with a first maximum data rate based at least in part on the unicast parameters, transmitting only the one or more multicast PDSCH transmissions in the slot in the serving cell in accordance with a second maximum data rate that is a product of the first maximum data rate and a scaling factor, or transmitting the one or more unicast PDSCH transmissions and the one or more multicast PDSCH transmissions in the slot in the serving cell in accordance with a third maximum data rate that is a sum of the first maximum data rate and the second maximum data rate.

In an eleventh aspect, transmitting the at least one of the one or more unicast PDSCH transmissions or the one or more multicast PDSCH transmissions in the slot in the serving cell includes transmitting the one or more unicast PDSCH transmissions and the one or more multicast PDSCH transmissions in the slot in the serving cell in accordance with a first maximum soft buffer size based at least in part on the unicast parameters, transmitting only the one or more unicast PDSCH transmissions in the slot in the serving cell in accordance with a second maximum soft buffer size based at least in part on the first maximum soft buffer size and a scaling factor, or transmitting only the one or more multicast PDSCH transmissions in the slot in the serving cell in accordance with a third maximum soft buffer size based at least in part on the first maximum soft buffer size and the scaling factor, where the scaling factor is based at least in part on a unicast and multicast resource allocation.

In a twelfth aspect, transmitting the at least one of the one or more unicast PDSCH transmissions or the one or more multicast PDSCH transmissions in the slot in the serving cell includes transmitting the one or more unicast PDSCH transmissions and the one or more multicast PDSCH transmissions in the slot in the serving cell in accordance with a first maximum data rate based at least in part on the unicast parameters, transmitting only the one or more unicast PDSCH transmissions in the slot in the serving cell in accordance with a second maximum data rate based at least in part on the first maximum data rate and a scaling factor, or transmitting only the one or more multicast PDSCH transmissions in the slot in the serving cell in accordance with a third maximum data rate based at least in part on the first maximum data rate and the scaling factor, where the scaling factor is based at least in part on a unicast and multicast resource allocation.

In a thirteenth aspect, the capability information includes an indication of a first data rate scaling factor relating to a unicast processing capability of the UE and an indication of a second data rate scaling factor relating to a unicast and multicast processing capability of the UE.

In a fourteenth aspect, transmitting the at least one of the one or more unicast PDSCH transmissions or the one or more multicast PDSCH transmissions in the slot in the serving cell includes transmitting only the one or more unicast PDSCH transmissions in the slot in the serving cell in accordance with a first maximum data rate based at least in part on the unicast parameters and the first data rate scaling factor, transmitting only the one or more multicast PDSCH transmissions in the slot in the serving cell in accordance with the first maximum data rate, or transmitting the one or more unicast PDSCH transmissions and the one or more multicast PDSCH transmissions in the slot in the serving cell in accordance with a second maximum data rate based at least in part on the unicast parameters and the second data rate scaling factor.

In a fifteenth aspect, the capability information includes an indication of a first data rate scaling factor relating to a unicast processing capability of the UE and an indication of a second data rate scaling factor relating to a multicast processing capability of the UE.

In a sixteenth aspect, transmitting the at least one of the one or more unicast PDSCH transmissions or the one or more multicast PDSCH transmissions in the slot in the serving cell includes transmitting only the one or more unicast PDSCH transmissions in the slot in the serving cell in accordance with a first maximum data rate based at least in part on the unicast parameters and the first data rate scaling factor, transmitting only the one or more multicast PDSCH transmissions in the slot in the serving cell in accordance with a second maximum data rate based at least in part on the multicast parameters and the second data rate scaling factor, or transmitting the one or more unicast PDSCH transmissions and the one or more multicast PDSCH transmissions in the slot in accordance with a third maximum data rate that is a sum of the first maximum data rate and the second maximum data rate.

In a seventeenth aspect, the maximum soft buffer size is based at least in part on the unicast parameters, and the maximum data rate is based at least in part on the unicast parameters.

In an eighteenth aspect, the one or more unicast PDSCH transmissions and the one or more multicast PDSCH transmissions are frequency division multiplexed in the slot in the serving cell.

In a nineteenth aspect, the maximum soft buffer size is an upper bound of TB size with LBRM for allocated TBs in a 14 consecutive-symbol duration for a normal CP, or a 12 consecutive-symbol duration for an extended CP, ending at a last symbol of a latest PDSCH transmission within the active BWP on the serving cell.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
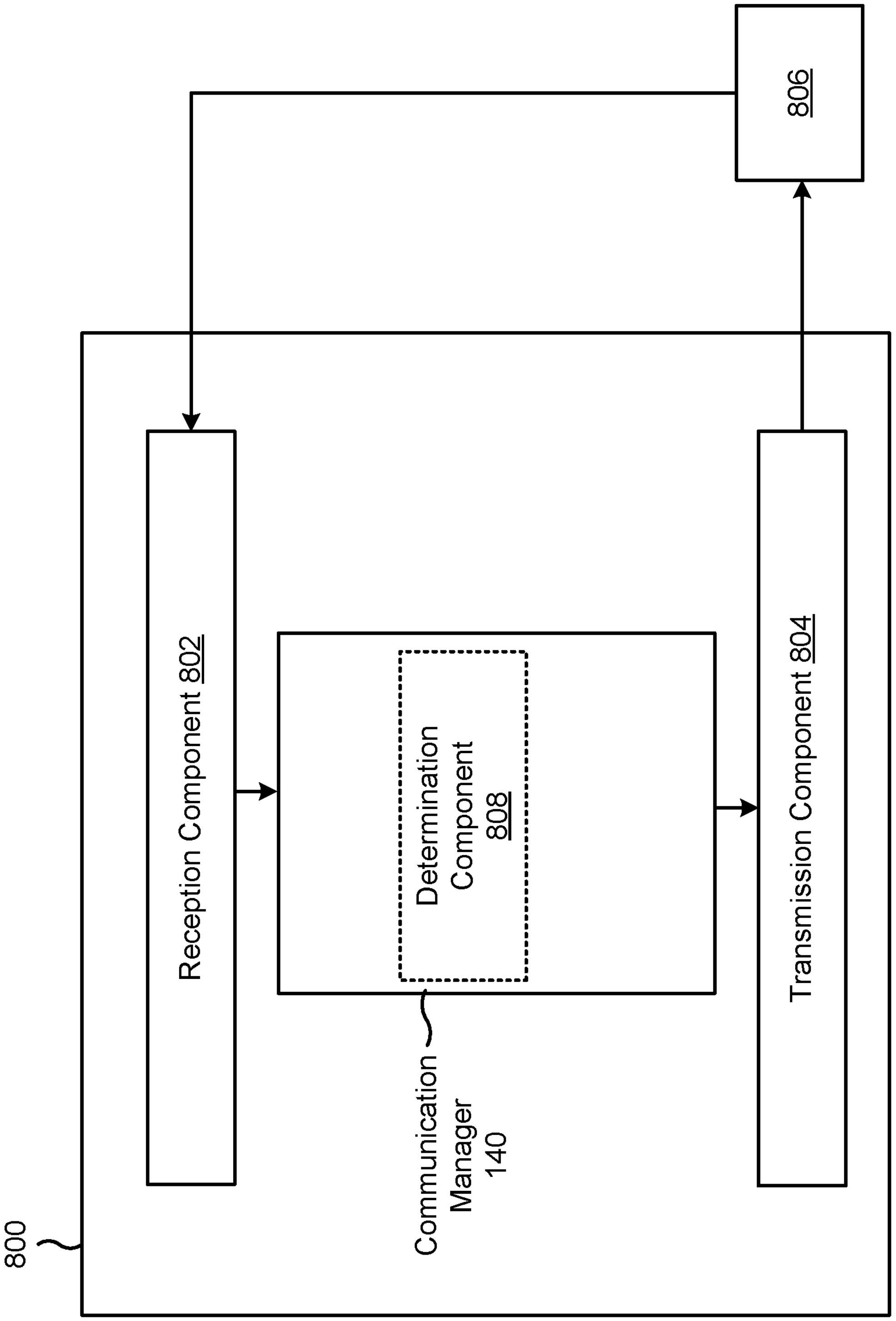
FIGS. 8-9 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a determination component 808, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, α component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The transmission component 804 may transmit, to a network entity, capability information relating to a capability of the UE for processing unicast and multicast PDSCH transmissions. The reception component 802 may receive, from the network entity, configuration information that indicates unicast parameters for unicast PDSCH transmissions and multicast parameters for multicast PDSCH transmissions. The reception component 802 may receive at least one of one or more unicast PDSCH transmissions or one or more multicast PDSCH transmissions in a slot in a serving cell in accordance with a maximum soft buffer size associated with the UE and a maximum data rate associated with the UE, wherein the maximum soft buffer size and the maximum data rate are based at least in part on at least one of the unicast parameters or the multicast parameters, and wherein the maximum soft buffer size is an upper bound of TB size with LBRM for allocated TBs in a time duration within an active BWP on the serving cell.

The determination component 808 may determine at least one of the maximum soft buffer size associated with the UE or the maximum data rate associated with the UE.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
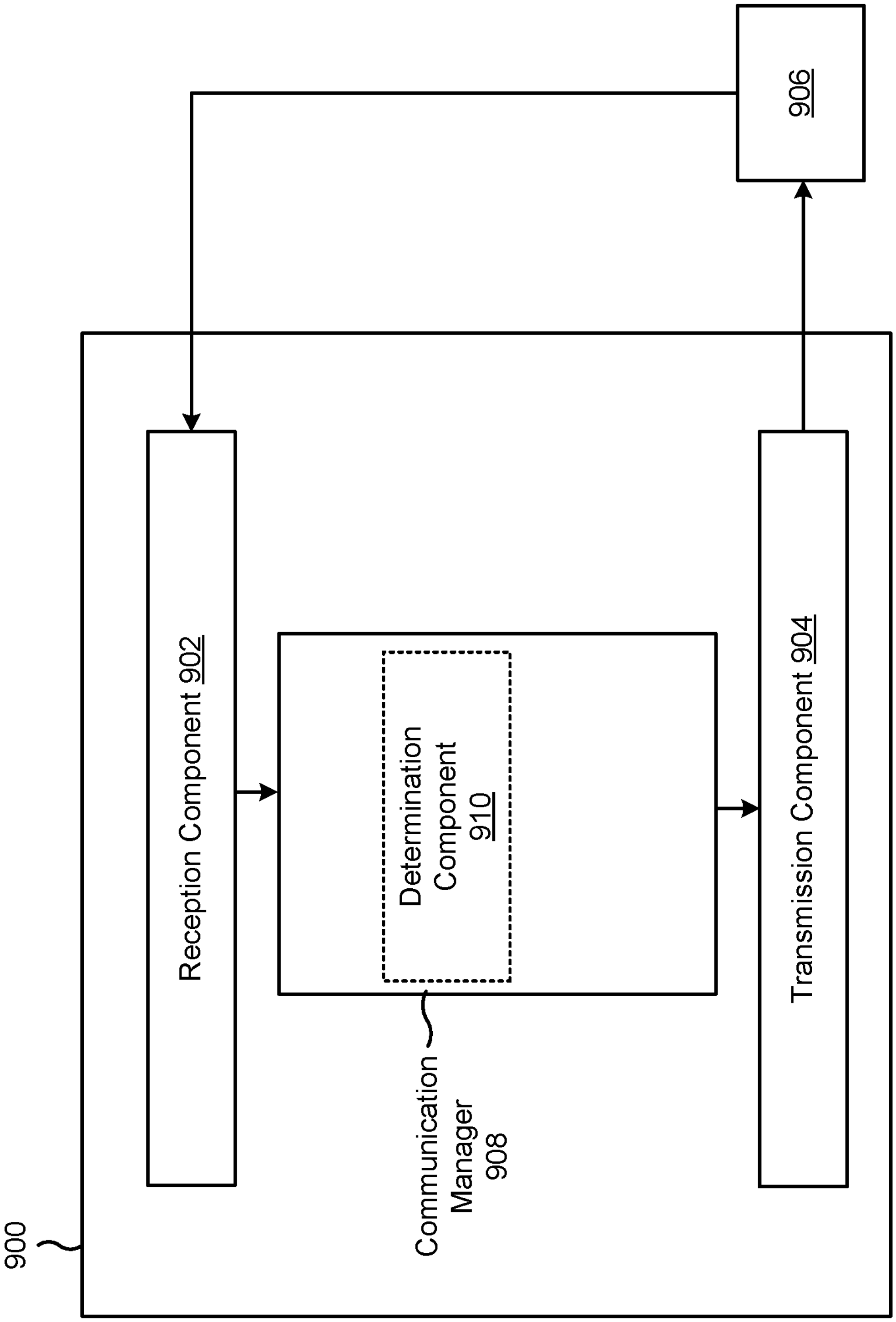

FIG. 9 is a diagram of an example apparatus 900 for wireless communication. The apparatus 900 may be a network entity, or a network entity may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 908. The communication manager 908 may include a determination component 910, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the network entity described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The communication manager 908 may control and/or otherwise manage one or more operations of the reception component 902 and/or the transmission component 904. In some aspects, the communication manager 908 may include one or more antennas, a modem, a controller/processor, a memory, or a combination thereof, of the base station described in connection with FIG. 2. The communication manager 908 may be, or be similar to, the communication manager 150 depicted in FIGS. 1 and 2. For example, in some aspects, the communication manager 908 may be configured to perform one or more of the functions described as being performed by the communication manager 150. In some aspects, the communication manager 908 may include the reception component 902 and/or the transmission component 904.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network entity described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network entity described in connection with FIG. 2. In some aspects, the transmission component 904 may be co-located with the reception component 902 in a transceiver.

The reception component 902 may receive capability information relating to a capability of a UE for processing unicast and multicast PDSCH transmissions. The transmission component 904 may transmit configuration information that indicates unicast parameters for unicast PDSCH transmissions and multicast parameters for multicast PDSCH transmissions. The transmission component 904 may transmit at least one of one or more unicast PDSCH transmissions or one or more multicast PDSCH transmissions in a slot in a serving cell in accordance with a maximum soft buffer size associated with the UE and a maximum data rate associated with the UE, wherein the maximum soft buffer size and the maximum data rate are based at least in part on at least one of the unicast parameters or the multicast parameters, and wherein the maximum soft buffer size is an upper bound of TB size with LBRM for allocated TBs in a time duration within an active BWP on the serving cell.

The determination component 910 may determine the maximum soft buffer size associated with the UE and the maximum data rate associated with the UE.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: transmitting, to a network entity, capability information relating to a capability of the UE for processing unicast and multicast physical downlink shared channel (PDSCH) transmissions; receiving, from the network entity, configuration information that indicates unicast parameters for unicast PDSCH transmissions and multicast parameters for multicast PDSCH transmissions; and receiving at least one of one or more unicast PDSCH transmissions or one or more multicast PDSCH transmissions in a slot in a serving cell in accordance with a maximum soft buffer size associated with the UE and a maximum data rate associated with the UE, wherein the maximum soft buffer size and the maximum data rate are based at least in part on at least one of the unicast parameters or the multicast parameters, and wherein the maximum soft buffer size is an upper bound of transport block (TB) size with limited buffer rate matching (LBRM) for allocated TBs in a time duration within an active bandwidth part (BWP) on the serving cell.

Aspect 2: The method of Aspect 1, wherein the maximum soft buffer size is based at least in part on the unicast parameters.

Aspect 3: The method of Aspect 2, wherein receiving the at least one of the one or more unicast PDSCH transmissions or the one or more multicast PDSCH transmissions in the slot in the serving cell comprises: receiving the one or more multicast PDSCH transmissions in the slot in the serving cell in accordance with the maximum soft buffer size that is based at least in part on the unicast parameters; or receiving the one or more unicast PDSCH transmissions and the one or more multicast PDSCH transmissions in the slot in the serving cell in accordance with the maximum soft buffer size that is based at least in part on the unicast parameters.

Aspect 4: The method of any of Aspects 1-3, wherein the maximum data rate is based at least in part on the unicast parameters and the capability information.

Aspect 5: The method of Aspect 4, wherein receiving the at least one of the one or more unicast PDSCH transmissions or the one or more multicast PDSCH transmissions in the slot in the serving cell comprises: receiving the one or more multicast PDSCH transmissions in the slot in the serving cell in accordance with the maximum data rate that is based at least in part on the unicast parameters and the capability information; or receiving the one or more unicast PDSCH transmissions and the one or more multicast PDSCH transmissions in the slot in the serving cell in accordance with the maximum data rate that is based at least in part on the unicast parameters and the capability information.

Aspect 6: The method of any of Aspects 1-5, wherein the maximum soft buffer size is a maximum soft buffer size with a maximum value among a first maximum soft buffer size that is based at least in part on the unicast parameters and a second maximum soft buffer size that is based at least in part on the multicast parameters.

Aspect 7: The method of any of Aspects 1-6, wherein the maximum data rate is a maximum data rate with a maximum value among a first maximum data rate that is based at least in part on the unicast parameters and a second maximum data rate that is based at least in part on the multicast parameters.

Aspect 8: The method of any of Aspects 1, 4-5, or 7, wherein receiving the at least one of the one or more unicast PDSCH transmissions or the one or more multicast PDSCH transmissions in the slot in the serving cell comprises: receiving only the one or more unicast PDSCH transmissions in the slot in the serving cell in accordance with a first maximum soft buffer size based at least in part on the unicast parameters; receiving only the one or more multicast PDSCH transmissions in the slot in the serving cell in accordance with a second maximum soft buffer size based at least in part on the multicast parameters; or receiving the one or more unicast PDSCH transmissions and the one or more multicast PDSCH transmissions in the slot in the serving cell in accordance with a third maximum soft buffer size that is a sum of the first maximum soft buffer size scaled by a first scaling factor and the second maximum soft buffer size scaled by a second scaling factor.

Aspect 9: The method of any of Aspects 1-3, 6, or 8, wherein receiving the at least one of the one or more unicast PDSCH transmissions or the one or more multicast PDSCH transmissions in the slot in the serving cell comprises: receiving only the one or more unicast PDSCH transmissions in the slot in the serving cell in accordance with a first maximum data rate based at least in part on the unicast parameters; receiving only the one or more multicast PDSCH transmissions in the slot in the serving cell in accordance with a second maximum data rate based at least in part on the multicast parameters; or receiving the one or more unicast PDSCH transmissions and the one or more multicast PDSCH transmissions in the slot in the serving cell in accordance with a third maximum data rate that is a sum of the first maximum data rate scaled by a first scaling factor and the second maximum data rate scaled by a second scaling factor.

Aspect 10: The method of any of Aspects 1, 4-5, 7, or 9, wherein receiving the at least one of the one or more unicast PDSCH transmissions or the one or more multicast PDSCH transmissions in the slot in the serving cell comprises: receiving only the one or more unicast PDSCH transmissions in the slot in the serving cell in accordance with a first maximum soft buffer size based at least in part on the unicast parameters; receiving only the one or more multicast PDSCH transmissions in the slot in the serving cell in accordance with a second maximum soft buffer size that is a product of the first maximum soft buffer size and a scaling factor; or receiving the one or more unicast PDSCH transmissions and the one or more multicast PDSCH transmissions in the slot in the serving cell in accordance with a third maximum soft buffer size that is a sum of the first maximum soft buffer size and the second maximum soft buffer size.

Aspect 11: The method of any of Aspects 1-3, 6, 8, or 10, wherein receiving the at least one of the one or more unicast PDSCH transmissions or the one or more multicast PDSCH transmissions in the slot in the serving cell comprises: receiving only the one or more unicast PDSCH transmissions in the slot in the serving cell in accordance with a first maximum data rate based at least in part on the unicast parameters; receiving only the one or more multicast PDSCH transmissions in the slot in the serving cell in accordance with a second maximum data rate that is a product of the first maximum data rate and a scaling factor; or receiving the one or more unicast PDSCH transmissions and the one or more multicast PDSCH transmissions in the slot in the serving cell in accordance with a third maximum data rate that is a sum of the first maximum data rate and the second maximum data rate.

Aspect 12: The method of any of Aspects 1, 4-5, 7, 9, or 11 wherein receiving the at least one of the one or more unicast PDSCH transmissions or the one or more multicast PDSCH transmissions in the slot in the serving cell comprises: receiving the one or more unicast PDSCH transmissions and the one or more multicast PDSCH transmissions in the slot in the serving cell in accordance with a first maximum soft buffer size based at least in part on the unicast parameters; receiving only the one or more unicast PDSCH transmissions in the slot in the serving cell in accordance with a second maximum soft buffer size based at least in part on the first maximum soft buffer size and a scaling factor; or receiving only the one or more multicast PDSCH transmissions in the slot in the serving cell in accordance with a third maximum soft buffer size based at least in part on the first maximum soft buffer size and the scaling factor, wherein the scaling factor is based at least in part on a unicast and multicast resource allocation.

Aspect 13: The method of any of Aspects 1-3, 6, 8, 10, or 12, wherein receiving the at least one of the one or more unicast PDSCH transmissions or the one or more multicast PDSCH transmissions in the slot in the serving cell comprises: receiving the one or more unicast PDSCH transmissions and the one or more multicast PDSCH transmissions in the slot in the serving cell in accordance with a first maximum data rate based at least in part on the unicast parameters; receiving only the one or more unicast PDSCH transmissions in the slot in the serving cell in accordance with a second maximum data rate based at least in part on the first maximum data rate and a scaling factor; or receiving only the one or more multicast PDSCH transmissions in the slot in the serving cell in accordance with a third maximum data rate based at least in part on the first maximum data rate and the scaling factor, wherein the scaling factor is based at least in part on a unicast and multicast resource allocation.

Aspect 14: The method of any of Aspects 1-3, 6, 8, 10, or 12, wherein the capability information includes an indication of a first data rate scaling factor relating to a unicast processing capability of the UE and an indication of a second data rate scaling factor relating to a unicast and multicast processing capability of the UE.

Aspect 15: The method of Aspect 14, wherein receiving the at least one of the one or more unicast PDSCH transmissions or the one or more multicast PDSCH transmissions in the slot in the serving cell comprises: receiving only the one or more unicast PDSCH transmissions in the slot in the serving cell in accordance with a first maximum data rate based at least in part on the unicast parameters and the first data rate scaling factor; receiving only the one or more multicast PDSCH transmissions in the slot in the serving cell in accordance with the first maximum data rate; or receiving the one or more unicast PDSCH transmissions and the one or more multicast PDSCH transmissions in the slot in the serving cell in accordance with a second maximum data rate based at least in part on the unicast parameters and the second data rate scaling factor.

Aspect 16: The method of any of Aspects 1-3, 6, 8, 10, or 12, wherein the capability information includes an indication of a first data rate scaling factor relating to a unicast processing capability of the UE and an indication of a second data rate scaling factor relating to a multicast processing capability of the UE.

Aspect 17: The method of Aspect 16, wherein receiving the at least one of the one or more unicast PDSCH transmissions or the one or more multicast PDSCH transmissions in the slot in the serving cell comprises: receiving only the one or more unicast PDSCH transmissions in the slot in the serving cell in accordance with a first maximum data rate based at least in part on the unicast parameters and the first data rate scaling factor; receiving only the one or more multicast PDSCH transmissions in the slot in the serving cell in accordance with a second maximum data rate based at least in part on the multicast parameters and the second data rate scaling factor; or receiving the one or more unicast PDSCH transmissions and the one or more multicast PDSCH transmissions in the slot in accordance with a third maximum data rate that is a sum of the first maximum data rate and the second maximum data rate.

Aspect 18: The method of any of Aspects 1-17, wherein the one or more unicast PDSCH transmissions and the one or more multicast PDSCH transmissions are frequency division multiplexed in the slot in the serving cell.

Aspect 19: The method of any of Aspects 1-18, wherein the maximum soft buffer size is an upper bound of TB size LBRM with for allocated TBs in a 14 consecutive-symbol duration for a normal cyclic prefix (CP), or a 12 consecutive-symbol duration for an extended CP, ending at a last symbol of a latest PDSCH transmission within the active BWP on the serving cell.

Aspect 20: A method of wireless communication performed by a network entity, comprising: receiving capability information relating to a capability of a user equipment (UE) for processing unicast and multicast physical downlink shared channel (PDSCH) transmissions; transmitting configuration information that indicates unicast parameters for unicast PDSCH transmissions and multicast parameters for multicast PDSCH transmissions; and transmitting at least one of one or more unicast PDSCH transmissions or one or more multicast PDSCH transmissions in a slot in a serving cell in accordance with a maximum soft buffer size associated with the UE and a maximum data rate associated with the UE, wherein the maximum soft buffer size and the maximum data rate are based at least in part on at least one of the unicast parameters or the multicast parameters, and wherein the maximum soft buffer size is an upper bound of transport block (TB) size with limited buffer rate matching (LBRM) for allocated TBs in a time duration within an active bandwidth part (BWP) on the serving cell.

Aspect 21: The method of Aspect 20, wherein the maximum soft buffer size is based at least in part on the unicast parameters.

Aspect 22: The method of Aspect 21, wherein transmitting the at least one of the one or more unicast PDSCH transmissions or the one or more multicast PDSCH transmissions in the slot in the serving cell comprises: transmitting the one or more multicast PDSCH transmissions in the slot in the serving cell in accordance with the maximum soft buffer size that is based at least in part on the unicast parameters; or transmitting the one or more unicast PDSCH transmissions and the one or more multicast PDSCH transmissions in the slot in the serving cell in accordance with the maximum soft buffer size that is based at least in part on the unicast parameters.

Aspect 23: The method of any of Aspects 20-22, wherein the maximum data rate is based at least in part on the unicast parameters and the capability information.

Aspect 24: The method of Aspect 23, wherein transmitting the at least one of the one or more unicast PDSCH transmissions or the one or more multicast PDSCH transmissions in the slot in the serving cell comprises: transmitting the one or more multicast PDSCH transmissions in the slot in the serving cell in accordance with the maximum data rate that is based at least in part on the unicast parameters and the capability information; or transmitting the one or more unicast PDSCH transmissions and the one or more multicast PDSCH transmissions in the slot in the serving cell in accordance with the maximum data rate that is based at least in part on the unicast parameters and the capability information.

Aspect 25: The method of any of Aspects 20-24, wherein the maximum soft buffer size is a maximum soft buffer size with a maximum value among a first maximum soft buffer size that is based at least in part on the unicast parameters and a second maximum soft buffer size that is based at least in part on the multicast parameters.

Aspect 26: The method of any of Aspects 20-25, wherein the maximum data rate is a maximum data rate with a maximum value among a first maximum data rate that is based at least in part on the unicast parameters and a second maximum data rate that is based at least in part on the multicast parameters.

Aspect 27: The method of any of Aspects 20, 23-24, or 26, wherein transmitting the at least one of the one or more unicast PDSCH transmissions or the one or more multicast PDSCH transmissions in the slot in the serving cell comprises: transmitting only the one or more unicast PDSCH transmissions in the slot in the serving cell in accordance with a first maximum soft buffer size based at least in part on the unicast parameters; transmitting only the one or more multicast PDSCH transmissions in the slot in the serving cell in accordance with a second maximum soft buffer size based at least in part on the multicast parameters; or transmitting the one or more unicast PDSCH transmissions and the one or more multicast PDSCH transmissions in the slot in the serving cell in accordance with a third maximum soft buffer size that is a sum of the first maximum soft buffer size scaled by a first scaling factor and the second maximum soft buffer size scaled by a second scaling factor.

Aspect 28: The method of any of Aspects 20-22, 25, or 27, wherein transmitting the at least one of the one or more unicast PDSCH transmissions or the one or more multicast PDSCH transmissions in the slot in the serving cell comprises: transmitting only the one or more unicast PDSCH transmissions in the slot in the serving cell in accordance with a first maximum data rate based at least in part on the unicast parameters; transmitting only the one or more multicast PDSCH transmissions in the slot in the serving cell in accordance with a second maximum data rate based at least in part on the multicast parameters; or transmitting the one or more unicast PDSCH transmissions and the one or more multicast PDSCH transmissions in the slot in the serving cell in accordance with a third maximum data rate that is a sum of the first maximum data rate scaled by a first scaling factor and the second maximum data rate scaled by a second scaling factor.

Aspect 29: The method of any of Aspects 20, 23-24, 26, or 28, wherein transmitting the at least one of the one or more unicast PDSCH transmissions or the one or more multicast PDSCH transmissions in the slot in the serving cell comprises: transmitting only the one or more unicast PDSCH transmissions in the slot in the serving cell in accordance with a first maximum soft buffer size based at least in part on the unicast parameters; transmitting only the one or more multicast PDSCH transmissions in the slot in the serving cell in accordance with a second maximum soft buffer size that is a product of the first maximum soft buffer size and a scaling factor; or transmitting the one or more unicast PDSCH transmissions and the one or more multicast PDSCH transmissions in the slot in the serving cell in accordance with a third maximum soft buffer size that is a sum of the first maximum soft buffer size and the second maximum soft buffer size.

Aspect 30: The method of any of Aspects 20-22, 26, 27, or 29, wherein transmitting the at least one of the one or more unicast PDSCH transmissions or the one or more multicast PDSCH transmissions in the slot in the serving cell comprises: transmitting only the one or more unicast PDSCH transmissions in the slot in the serving cell in accordance with a first maximum data rate based at least in part on the unicast parameters; transmitting only the one or more multicast PDSCH transmissions in the slot in the serving cell in accordance with a second maximum data rate that is a product of the first maximum data rate and a scaling factor; or transmitting the one or more unicast PDSCH transmissions and the one or more multicast PDSCH transmissions in the slot in the serving cell in accordance with a third maximum data rate that is a sum of the first maximum data rate and the second maximum data rate.

Aspect 31: The method of any of Aspects 20, 23-24, 26, 28, or 30, wherein transmitting the at least one of the one or more unicast PDSCH transmissions or the one or more multicast PDSCH transmissions in the slot in the serving cell comprises: transmitting the one or more unicast PDSCH transmissions and the one or more multicast PDSCH transmissions in the slot in the serving cell in accordance with a first maximum soft buffer size based at least in part on the unicast parameters; transmitting only the one or more unicast PDSCH transmissions in the slot in the serving cell in accordance with a second maximum soft buffer size based at least in part on the first maximum soft buffer size and a scaling factor; or transmitting only the one or more multicast PDSCH transmissions in the slot in the serving cell in accordance with a third maximum soft buffer size based at least in part on the first maximum soft buffer size and the scaling factor, wherein the scaling factor is based at least in part on a unicast and multicast resource allocation.

Aspect 32: The method of any of Aspects 20-22, 25, 27, 29, or 31, wherein transmitting the at least one of the one or more unicast PDSCH transmissions or the one or more multicast PDSCH transmissions in the slot in the serving cell comprises: transmitting the one or more unicast PDSCH transmissions and the one or more multicast PDSCH transmissions in the slot in the serving cell in accordance with a first maximum data rate based at least in part on the unicast parameters; transmitting only the one or more unicast PDSCH transmissions in the slot in the serving cell in accordance with a second maximum data rate based at least in part on the first maximum data rate and a scaling factor; or transmitting only the one or more multicast PDSCH transmissions in the slot in the serving cell in accordance with a third maximum data rate based at least in part on the first maximum data rate and the scaling factor, wherein the scaling factor is based at least in part on a unicast and multicast resource allocation.

Aspect 33: The method of any of Aspects 20-22, 25, 27, 29, or 31, wherein the capability information includes an indication of a first data rate scaling factor relating to a unicast processing capability of the UE and an indication of a second data rate scaling factor relating to a unicast and multicast processing capability of the UE.

Aspect 34: The method of Aspect 33, wherein transmitting the at least one of the one or more unicast PDSCH transmissions or the one or more multicast PDSCH transmissions in the slot in the serving cell comprises: transmitting only the one or more unicast PDSCH transmissions in the slot in the serving cell in accordance with a first maximum data rate based at least in part on the unicast parameters and the first data rate scaling factor; transmitting only the one or more multicast PDSCH transmissions in the slot in the serving cell in accordance with the first maximum data rate; or transmitting the one or more unicast PDSCH transmissions and the one or more multicast PDSCH transmissions in the slot in the serving cell in accordance with a second maximum data rate based at least in part on the unicast parameters and the second data rate scaling factor.

Aspect 35: The method of any of Aspects 20-22, 25, 27, 29, or 31, wherein the capability information includes an indication of a first data rate scaling factor relating to a unicast processing capability of the UE and an indication of a second data rate scaling factor relating to a multicast processing capability of the UE.

Aspect 36: The method of Aspect 35, wherein transmitting the at least one of the one or more unicast PDSCH transmissions or the one or more multicast PDSCH transmissions in the slot in the serving cell comprises: transmitting only the one or more unicast PDSCH transmissions in the slot in the serving cell in accordance with a first maximum data rate based at least in part on the unicast parameters and the first data rate scaling factor; transmitting only the one or more multicast PDSCH transmissions in the slot in the serving cell in accordance with a second maximum data rate based at least in part on the multicast parameters and the second data rate scaling factor; or transmitting the one or more unicast PDSCH transmissions and the one or more multicast PDSCH transmissions in the slot in accordance with a third maximum data rate that is a sum of the first maximum data rate and the second maximum data rate.

Aspect 37: The method of any of Aspects 20-36, wherein the one or more unicast PDSCH transmissions and the one or more multicast PDSCH transmissions are frequency division multiplexed in the slot in the serving cell.

Aspect 38: The method of any of Aspects 20-37, wherein the maximum soft buffer size is an upper bound of TB size with LBRM for allocated TBs in a 14 consecutive-symbol duration for a normal cyclic prefix (CP), or a 12 consecutive-symbol duration for an extended CP, ending at a last symbol of a latest PDSCH transmission within the active BWP on the serving cell.

Aspect 39: An apparatus for wireless communication at a device, comprising a processor; memory coupled with the processor; and instructions stored in the memory and executable by the processor to cause the apparatus to perform the method of one or more of Aspects 1-19.

Aspect 40: A device for wireless communication, comprising a memory and one or more processors coupled to the memory, the one or more processors configured to perform the method of one or more of Aspects 1-19.

Aspect 41: An apparatus for wireless communication, comprising at least one means for performing the method of one or more of Aspects 1-19.

Aspect 42: A non-transitory computer-readable medium storing code for wireless communication, the code comprising instructions executable by a processor to perform the method of one or more of Aspects 1-19.

Aspect 43: A non-transitory computer-readable medium storing a set of instructions for wireless communication, the set of instructions comprising one or more instructions that, when executed by one or more processors of a device, cause the device to perform the method of one or more of Aspects 1-19.

Aspect 44: An apparatus for wireless communication at a device, comprising a processor; memory coupled with the processor; and instructions stored in the memory and executable by the processor to cause the apparatus to perform the method of one or more of Aspects 20-38.

Aspect 45: A device for wireless communication, comprising a memory and one or more processors coupled to the memory, the one or more processors configured to perform the method of one or more of Aspects 20-38.

Aspect 46: An apparatus for wireless communication, comprising at least one means for performing the method of one or more of Aspects 20-38.

Aspect 47: A non-transitory computer-readable medium storing code for wireless communication, the code comprising instructions executable by a processor to perform the method of one or more of Aspects 20-38.

Aspect 48: A non-transitory computer-readable medium storing a set of instructions for wireless communication, the set of instructions comprising one or more instructions that, when executed by one or more processors of a device, cause the device to perform the method of one or more of Aspects 20-48.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors, coupled to the memory, configured to:

transmit, to a network entity, capability information relating to a capability of the UE for processing unicast and multicast physical downlink shared channel (PDSCH) transmissions in a same slot;

receive, from the network entity, configuration information that indicates unicast parameters for unicast PDSCH transmissions and multicast parameters for multicast PDSCH transmissions, the unicast parameters and the multicast parameters comprising separate parameters for a maximum number of layers, a maximum modulation order, an overhead, or a maximum number of physical resource blocks (PRBs) for unicast PDSCH transmissions and multicast PDSCH transmissions, respectively; and receive one or more unicast PDSCH transmissions and one or more multicast PDSCH transmissions in a slot in a serving cell in accordance with a maximum soft buffer size associated with the UE and a maximum data rate associated with the UE, wherein, for both the one or more unicast PDSCH transmissions and the one or more multicast PDSCH transmissions, the maximum soft buffer size and the maximum data rate are calculated by the UE based at least in part on one of the unicast parameters for unicast PDSCH transmissions or the multicast parameters for multicast PDSCH transmissions, and wherein the maximum soft buffer size is an upper bound of transport block (TB) size with limited buffer rate matching (LBRM) for allocated TBs in a time duration within an active bandwidth part (BWP) on the serving cell.

2. The UE of claim 1, wherein the maximum soft buffer size is an upper bound of TB size with LBRM for allocated TBs in a 14 consecutive-symbol duration for a normal cyclic prefix (CP), or a 12 consecutive-symbol duration for an extended CP, ending at a last symbol of a latest PDSCH transmission within the active BWP on the serving cell.

3. The UE of claim 1, wherein the maximum soft buffer size is based at least in part on the unicast parameters.

4. The UE of claim 3, wherein the one or more processors, to receive the one or more unicast PDSCH transmissions and the one or more multicast PDSCH transmissions in the slot in the serving cell, are configured to:

receive the one or more unicast PDSCH transmissions and the one or more multicast PDSCH transmissions in the slot in the serving cell in accordance with the maximum soft buffer size that is based at least in part on the unicast parameters.

5. The UE of claim 1, wherein the maximum data rate is based at least in part on the unicast parameters and the capability information.

6. The UE of claim 5, wherein the one or more processors, to receive the one or more unicast PDSCH transmissions and the one or more multicast PDSCH transmissions in the slot in the serving cell, are configured to:

receive the one or more unicast PDSCH transmissions and the one or more multicast PDSCH transmissions in the slot in the serving cell in accordance with the maximum data rate that is based at least in part on the unicast parameters and the capability information.

7. The UE of claim 1, wherein the maximum soft buffer size is based at least in part on the unicast parameters, and wherein the maximum data rate is based at least in part on the unicast parameters.

8. The UE of claim 7, wherein the one or more unicast PDSCH transmissions and the one or more multicast PDSCH transmissions are frequency division multiplexed in the slot in the serving cell.

9. The UE of claim 1, wherein the maximum soft buffer size is a maximum soft buffer size with a maximum value among a first maximum soft buffer size that is based at least in part on the unicast parameters and a second maximum soft buffer size that is based at least in part on the multicast parameters, and wherein the maximum data rate is a maximum data rate with a maximum value among a first maximum data rate that is based at least in part on the unicast parameters and a second maximum data rate that is based at least in part on the multicast parameters.

10. The UE of claim 1, wherein the one or more processors, to receive the one or more unicast PDSCH transmissions and the one or more multicast PDSCH transmissions in the slot in the serving cell, are configured to:

receive the one or more unicast PDSCH transmissions and the one or more multicast PDSCH transmissions in the slot in the serving cell in accordance with the maximum soft buffer size that is a sum of a first maximum soft buffer size scaled by a first scaling factor and a second maximum soft buffer size scaled by a second scaling factor and the maximum data rate that is a sum of a first maximum data rate scaled by a first scaling factor and a second maximum data rate scaled by a second scaling factor, wherein the first maximum soft buffer size and the first maximum data rate are based at least in part on the unicast parameters, and the maximum soft buffer size and the second maximum data rate are based at least in part on the multicast parameters.

11. The UE of claim 1, wherein the one or more processors, to receive the one or more unicast PDSCH transmissions and the one or more multicast PDSCH transmissions in the slot in the serving cell, are configured to:

receive the one or more unicast PDSCH transmissions and the one or more multicast PDSCH transmissions in the slot in the serving cell in accordance with the maximum soft buffer size that is a sum of a first maximum soft buffer size and a second maximum soft buffer size and the maximum data rate that is a sum of a first maximum data rate and a second maximum data rate, wherein the second maximum soft buffer size is a product of the first maximum soft buffer size and a scaling factor, the second maximum data rate is a product of the first maximum data rate and the scaling factor, the first maximum soft buffer size and the first maximum data rate are based at least in part on the unicast parameters, and the maximum soft buffer size and the second maximum data rate are based at least in part on the multicast parameters.

12. The UE of claim 1, wherein the one or more processors, to receive the at least one of the one or more unicast PDSCH transmissions or the one or more multicast PDSCH transmissions in the slot in the serving cell, are configured to:

receive the one or more unicast PDSCH transmissions and the one or more multicast PDSCH transmissions in the slot in the serving cell in accordance with a first maximum soft buffer size based at least in part on the unicast parameters and a first maximum data rate based at least in part on the unicast parameters.

13. The UE of claim 1, wherein the capability information includes an indication of a first data rate scaling factor relating to a unicast processing capability of the UE and an indication of a second data rate scaling factor relating to a unicast and multicast processing capability of the UE, and wherein the one or more processors, to receive the at least the one or more unicast PDSCH transmissions and the one or more multicast PDSCH transmissions in the slot in the serving cell, are configured to:

receive the one or more unicast PDSCH transmissions and the one or more multicast PDSCH transmissions in the slot in the serving cell in accordance with a second maximum data rate based at least in part on the unicast parameters and the second data rate scaling factor.

14. The UE of claim 1, wherein the capability information includes an indication of a first data rate scaling factor relating to a unicast processing capability of the UE and an indication of a second data rate scaling factor relating to a multicast processing capability of the UE, and wherein the one or more processors, to receive one or more unicast PDSCH transmissions and the one or more multicast PDSCH transmissions in the slot in the serving cell, are configured to:

receive the one or more unicast PDSCH transmissions and the one or more multicast PDSCH transmissions in the slot in accordance with the maximum data rate that is a sum of a first maximum data rate and second maximum data rate, wherein the first maximum data rate is based at least in part on the unicast parameters and the first data rate scaling factor, and the second maximum data rate is based at least in part on the multicast parameters and the second data rate scaling factor.

15. A network entity for wireless communication, comprising:

a memory; and one or more processors, coupled to the memory, configured to:

receive capability information relating to a capability of a user equipment (UE) for processing unicast and multicast physical downlink shared channel (PDSCH) transmissions in a same slot;

transmit configuration information that indicates unicast parameters for unicast PDSCH transmissions and multicast parameters for multicast PDSCH transmissions, the unicast parameters and the multicast parameters comprising separate parameters for a maximum number of layers, a maximum modulation order, an overhead, or a maximum number of physical resource blocks (PRBs) for unicast PDSCH transmissions and multicast PDSCH transmissions, respectively; and transmit one or more unicast PDSCH transmissions and one or more multicast PDSCH transmissions in a slot in a serving cell in accordance with a maximum soft buffer size associated with the UE and a maximum data rate associated with the UE, wherein, for both the one or more unicast PDSCH transmissions and the one or more multicast PDSCH transmissions, the maximum soft buffer size and the maximum data rate are calculated by the network entity based at least in part on at least one of the unicast parameters for unicast PDSCH transmissions or the multicast parameters for multicast PDSCH transmissions, and wherein the maximum soft buffer size is an upper bound of transport block (TB) size with limited buffer rate matching (LBRM) for allocated TBs in a time duration within an active bandwidth part (BWP) on the serving cell.

16. The network entity of claim 15, wherein the maximum soft buffer size is based at least in part on the unicast parameters.

17. The network entity of claim 16, wherein the one or more processors, to transmit the one or more unicast PDSCH transmissions and the one or more multicast PDSCH transmissions in the slot in the serving cell, are configured to:

transmit the one or more unicast PDSCH transmissions and the one or more multicast PDSCH transmissions in the slot in the serving cell in accordance with the maximum soft buffer size that is based at least in part on the unicast parameters.

18. The network entity of claim 15, wherein the maximum data rate is based at least in part on the unicast parameters and the capability information.

19. The network entity of claim 18, wherein the one or more processors, to transmit the one or more unicast PDSCH transmissions and the one or more multicast PDSCH transmissions in the slot in the serving cell, are configured to:

transmit the one or more unicast PDSCH transmissions and the one or more multicast PDSCH transmissions in the slot in the serving cell in accordance with the maximum data rate that is based at least in part on the unicast parameters and the capability information.

20. The network entity of claim 15, wherein the maximum soft buffer size is based at least in part on the unicast parameters, and wherein the maximum data rate is based at least in part on the unicast parameters.

21. A method of wireless communication performed by a user equipment (UE), comprising:

transmitting, to a network entity, capability information relating to a capability of the UE for processing unicast and multicast physical downlink shared channel (PDSCH) transmissions in a same slot;

receiving, from the network entity, configuration information that indicates unicast parameters for unicast PDSCH transmissions and multicast parameters for multicast PDSCH transmissions, the unicast parameters and the multicast parameters comprising separate parameters for a maximum number of layers, a maximum modulation order, an overhead, or a maximum number of physical resource blocks (PRBs) for unicast PDSCH transmissions and multicast PDSCH transmissions, respectively; and receiving one or more unicast PDSCH transmissions and one or more multicast PDSCH transmissions in a slot in a serving cell in accordance with a maximum soft buffer size associated with the UE and a maximum data rate associated with the UE, wherein, for both the one or more unicast PDSCH transmissions and the one or more multicast PDSCH transmissions, the maximum soft buffer size and the maximum data rate are calculated by the UE based at least in part on one of the unicast parameters for unicast PDSCH transmissions or and at least one of the multicast parameters for multicast PDSCH transmissions, and wherein the maximum soft buffer size is an upper bound of transport block (TB) size with limited buffer rate matching (LBRM) for allocated TBs in a time duration within an active bandwidth part (BWP) on the serving cell.

22. The method of claim 21, wherein the maximum soft buffer size is based at least in part on the unicast parameters.

23. The method of claim 22, wherein receiving the at least one of the one or more unicast PDSCH transmissions or the one or more multicast PDSCH transmissions in the slot in the serving cell comprises:

receiving the one or more multicast PDSCH transmissions in the slot in the serving cell in accordance with the maximum soft buffer size that is based at least in part on the unicast parameters; or receiving the one or more unicast PDSCH transmissions and the one or more multicast PDSCH transmissions in the slot in the serving cell in accordance with the maximum soft buffer size that is based at least in part on the unicast parameters.

24. The method of claim 21, wherein the maximum data rate is based at least in part on the unicast parameters and the capability information.

25. The method of claim 24, wherein receiving the one or more unicast PDSCH transmissions and the one or more multicast PDSCH transmissions in the slot in the serving cell comprises:

receiving the one or more unicast PDSCH transmissions and the one or more multicast PDSCH transmissions in the slot in the serving cell in accordance with the maximum data rate that is based at least in part on the unicast parameters and the capability information.

26. A method of wireless communication performed by a network entity, comprising:

receiving capability information relating to a capability of a user equipment (UE) for processing unicast and multicast physical downlink shared channel (PDSCH) transmissions in a same slot;

transmitting configuration information that indicates unicast parameters for unicast PDSCH transmissions and multicast parameters for multicast PDSCH transmissions, the unicast parameters and the multicast parameters comprising separate parameters for a maximum number of layers, a maximum modulation order, an overhead, or a maximum number of physical resource blocks (PRBs) for unicast PDSCH transmissions and multicast PDSCH transmissions, respectively; and transmitting one or more unicast PDSCH transmissions and one or more multicast PDSCH transmissions in a slot in a serving cell in accordance with a maximum soft buffer size associated with the UE and a maximum data rate associated with the UE, wherein, for both the one or more unicast PDSCH transmissions and the one or more multicast PDSCH transmissions, the maximum soft buffer size and the maximum data rate are calculated by the network entity based at least in part on at least one of the unicast parameters for unicast PDSCH transmissions or the multicast parameters for multicast PDSCH transmissions, and wherein the maximum soft buffer size is an upper bound of transport block (TB) size with limited buffer rate matching (LBRM) for allocated TBs in a time duration within an active bandwidth part (BWP) on the serving cell.

27. The method of claim 26, wherein the maximum soft buffer size is based at least in part on the unicast parameters.

28. The method of claim 27, wherein transmitting the one or more unicast PDSCH transmissions and the one or more multicast PDSCH transmissions in the slot in the serving cell comprises:

transmitting the one or more unicast PDSCH transmissions and the one or more multicast PDSCH transmissions in the slot in the serving cell in accordance with the maximum soft buffer size that is based at least in part on the unicast parameters.

29. The method of claim 26, wherein the maximum data rate is based at least in part on the unicast parameters and the capability information.

30. The method of claim 29, wherein transmitting the one or more unicast PDSCH transmissions and the one or more multicast PDSCH transmissions in the slot in the serving cell comprises:

transmitting the one or more unicast PDSCH transmissions and the one or more multicast PDSCH transmissions in the slot in the serving cell in accordance with the maximum data rate that is based at least in part on the unicast parameters and the capability information.

* * * * *